US012587316B2

(12) United States Patent
Mondet et al.

(10) Patent No.: US 12,587,316 B2
(45) Date of Patent: Mar. 24, 2026

(54) ENHANCEMENTS TO APPLICATION DATA UNIT METADATA

(71) Applicant: QUALCOMM Incorporated, San Diego, CA (US)

(72) Inventors: Mickael Mondet, Louannec (FR); Yih-Hao Lin, San Diego, CA (US); Prashanth Haridas Hande, San Diego, CA (US); Ravi Agarwal, San Diego, CA (US); Peerapol Tinnakornsrisuphap, San Diego, CA (US); Miguel Griot, La Jolla, CA (US); Dario Serafino Tonesi, San Diego, CA (US); Sitaramanjaneyulu Kanamarlapudi, San Diego, CA (US); Ozcan Ozturk, San Diego, CA (US); Aziz Gholmieh, Del Mar, CA (US); Sanket Sanjay Kalamkar, San Diego, CA (US); Gavin Bernard Horn, La Jolla, CA (US); Linhai He, San Diego, CA (US)

( * ) Notice: Subject to any disclaimer, the term of this patent is extended or adjusted under 35 U.S.C. 154(b) by 574 days.

(21) Appl. No.: 17/884,550

(22) Filed: Aug. 9, 2022

(65) Prior Publication Data

US 2024/0056225 A1     Feb. 15, 2024

(51) Int. Cl.
*H04W 28/02*        (2009.01)
*H04L 1/1607*        (2023.01)
(Continued)

(52) U.S. Cl.
CPC .......... *H04L 1/1671* (2013.01); *H04L 1/1642* (2013.01)

(58) Field of Classification Search
None
See application file for complete search history.

(56) References Cited

U.S. PATENT DOCUMENTS

2024/0022941 A1*   1/2024   Jeong ................... H04W 24/10
2024/0022954 A1*   1/2024   Chen ................. H04W 28/0278
(Continued)

FOREIGN PATENT DOCUMENTS

WO    WO-2017035727 A1    3/2017
WO    WO-2021243535 A1   12/2021

OTHER PUBLICATIONS

U.S. Appl. No. 63/395,639, filed 2022.*
International Search Report and Written Opinion—PCT/US2023/071360—ISA/EPO—Nov. 7, 2023.

*Primary Examiner* — Sithu Ko

(57)     ABSTRACT

Methods, systems, and devices for wireless communication are described. A user equipment (UE) may receive control information that identifies criteria to use for determining a delivery status of a protocol data unit (PDU) set that includes multiple PDUs. The PDU set may be associated with an application layer of the UE. Accordingly, the UE may receive at least a portion of the PDU set, and may determine the delivery status of the PDU set based on the received portion of the PDU set and the criteria identified by the control information. The delivery status of the PDU set may refer to whether the PDU set was successfully delivered to the UE. The delivery status of the PDU set may be based on a quantity of bits or PDUs in the received portion of the PDU set, a threshold quantity of bits or PDUs, or a combination thereof.

30 Claims, 17 Drawing Sheets

(51) Int. Cl.
    *H04L 47/32*        (2022.01)
    *H04W 76/28*      (2018.01)

(56)             References Cited

U.S. PATENT DOCUMENTS

| | | | |
|---|---|---|---|
| 2024/0049040 A1* | 2/2024 | Ji | H04W 28/0268 |
| 2024/0049047 A1* | 2/2024 | Yu | H04W 28/0289 |
| 2024/0348517 A1* | 10/2024 | John | H04L 65/80 |
| 2024/0396845 A1* | 11/2024 | Zhang | H04L 47/32 |
| 2024/0397372 A1* | 11/2024 | Lei | H04W 24/02 |
| 2024/0414567 A1* | 12/2024 | Teyeb | H04L 47/28 |
| 2025/0024317 A1* | 1/2025 | Sha | H04W 28/0268 |
| 2025/0039740 A1* | 1/2025 | Fu | H04L 1/18 |

* cited by examiner

APP 445

405

FEC

410

IP Packetization

415

420

UPF 450

425 gNB-CU-UP 455

Header Compression

430

Integrity Protection

435

Ciphering

Ciphered     Add PDCP Header + ADU Metadata

440 gNB-DU 460

400

Control Information Receiving Component

825

PDU Receiving Component

830

Delivery Status Determining Component

835

Metadata Determining Component

840

820

800

Control Information Outputting Component

1225

PDU Outputting Component

1230

PDU Obtaining Component

1235

PDU Delivery Status Component

1240

Control Information Obtaining Component

1245

1220

1200

130

105

115

Network
Entity

Transceiver

1310

Antenna

1315

Communications
Manager

1320

Memory

Code

1330

1325

1340

Processor

1335

1305

1300

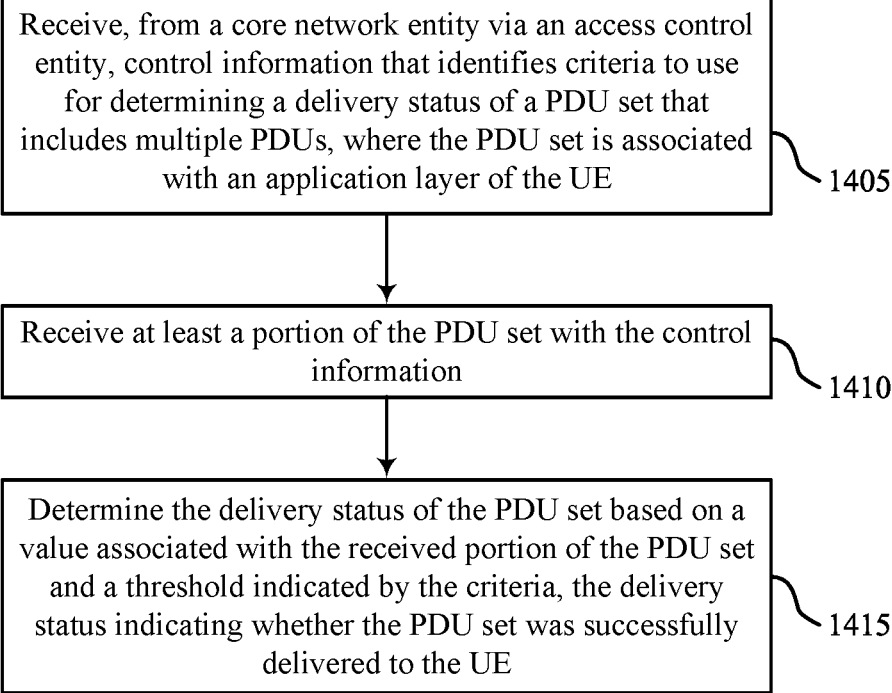

Receive, from a core network entity via an access control entity, control information that identifies criteria to use for determining a delivery status of a PDU set that includes multiple PDUs, where the PDU set is associated with an application layer of the UE ⟩ 1405

Receive at least a portion of the PDU set with the control information ⟩ 1410

Determine the delivery status of the PDU set based on a value associated with the received portion of the PDU set and a threshold indicated by the criteria, the delivery status indicating whether the PDU set was successfully delivered to the UE ⟩ 1415

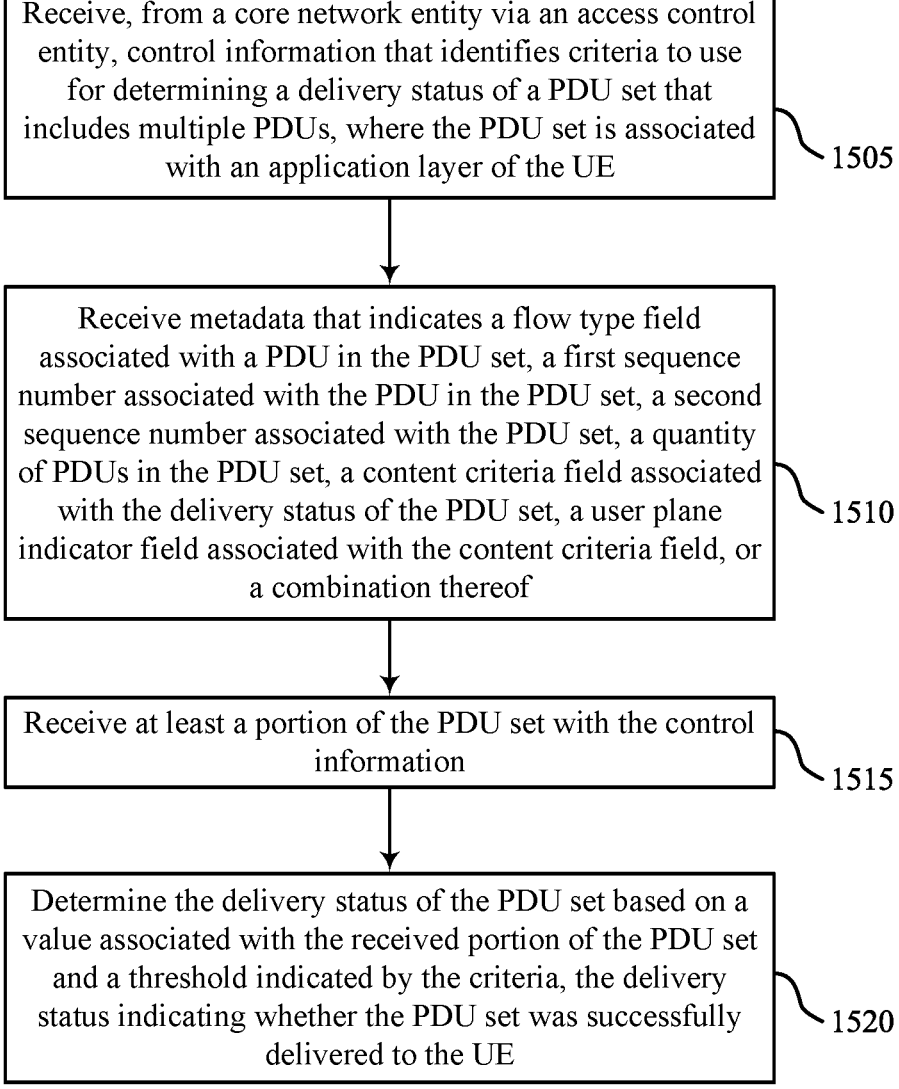

Receive, from a core network entity via an access control entity, control information that identifies criteria to use for determining a delivery status of a PDU set that includes multiple PDUs, where the PDU set is associated with an application layer of the UE ⟩ 1505

Receive metadata that indicates a flow type field associated with a PDU in the PDU set, a first sequence number associated with the PDU in the PDU set, a second sequence number associated with the PDU set, a quantity of PDUs in the PDU set, a content criteria field associated with the delivery status of the PDU set, a user plane indicator field associated with the content criteria field, or a combination thereof ⟩ 1510

Receive at least a portion of the PDU set with the control information ⟩ 1515

Determine the delivery status of the PDU set based on a value associated with the received portion of the PDU set and a threshold indicated by the criteria, the delivery status indicating whether the PDU set was successfully delivered to the UE ⟩ 1520

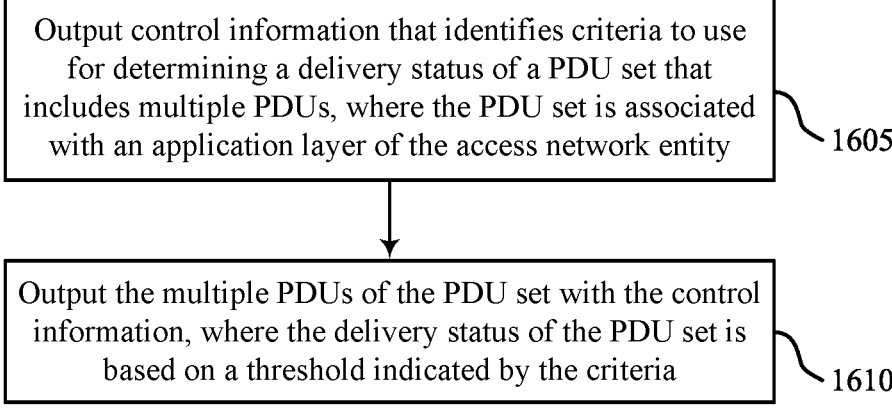

Output control information that identifies criteria to use for determining a delivery status of a PDU set that includes multiple PDUs, where the PDU set is associated with an application layer of the access network entity ⟩ 1605

Output the multiple PDUs of the PDU set with the control information, where the delivery status of the PDU set is based on a threshold indicated by the criteria ⟩ 1610

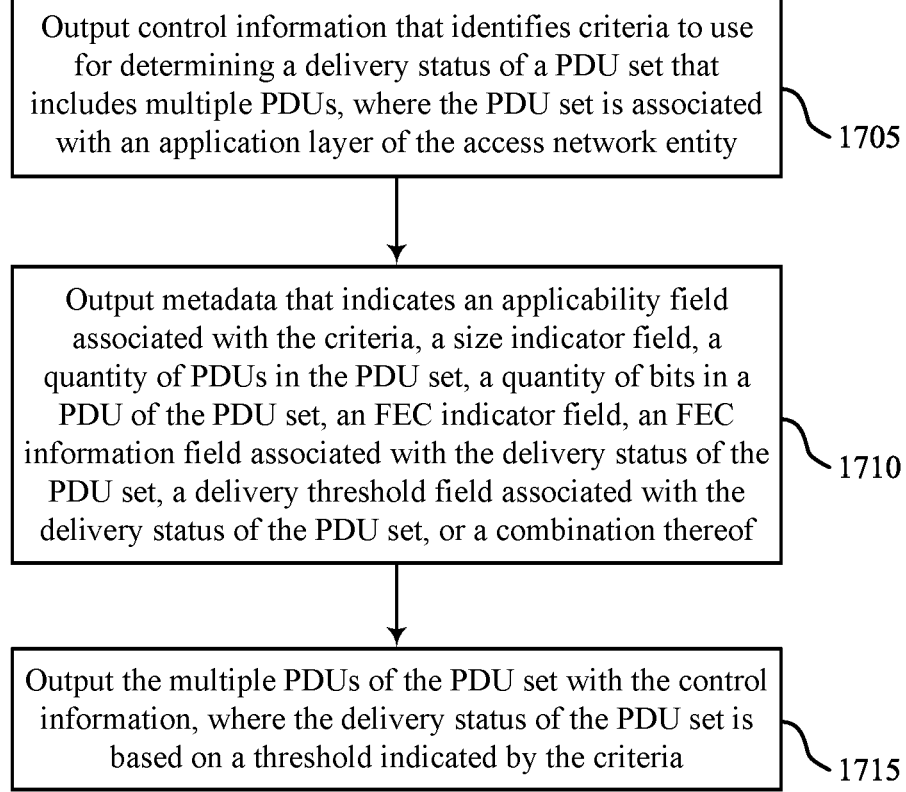

Output control information that identifies criteria to use for determining a delivery status of a PDU set that includes multiple PDUs, where the PDU set is associated with an application layer of the access network entity

1705

Output metadata that indicates an applicability field associated with the criteria, a size indicator field, a quantity of PDUs in the PDU set, a quantity of bits in a PDU of the PDU set, an FEC indicator field, an FEC information field associated with the delivery status of the PDU set, a delivery threshold field associated with the delivery status of the PDU set, or a combination thereof

1710

Output the multiple PDUs of the PDU set with the control information, where the delivery status of the PDU set is based on a threshold indicated by the criteria

ENHANCEMENTS TO APPLICATION DATA UNIT METADATA

FIELD OF TECHNOLOGY

The following relates to wireless communication, including enhancements to application data unit (ADU) metadata.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a UE may receive a burst of data from a network entity. The UE may use various metrics to determine whether the burst was successfully delivered or not. In some cases, however, the relatively inflexible nature of these metrics may be unsuitable for deployment scenarios with dynamic delivery conditions.

SUMMARY

The described techniques relate to improved methods, systems, devices, and apparatuses that support enhancements to application data unit (ADU) metadata. More specifically, the techniques described herein may improve the flexibility and applicability of ADU delivery criteria. In accordance with aspects of the present disclosure, a user equipment (UE) may receive control information that identifies criteria to use for determining a delivery status of a protocol data unit (PDU) set associated with an application layer of the UE. The UE may receive at least a portion of the PDU set (equivalently referred to as an ADU). Accordingly, the UE may determine the delivery status of the PDU set based on the received portion of the PDU set and the criteria identified by the control information. The delivery status of the PDU set may indicate whether the PDU set was successfully delivered or not.

A method for wireless communication at a UE is described. The method may include receiving, from a core network entity via an access network entity, control information that identifies criteria to use for determining a delivery status of a PDU set that includes multiple PDUs, where the PDU set is associated with an application layer of the UE. The method may further include receiving at least a portion of the PDU set with the control information. The method may further include determining the delivery status of the PDU set based on a value associated with the received portion of the PDU set and a threshold indicated by the criteria, the delivery status indicating whether the PDU set was successfully delivered to the UE.

An apparatus for wireless communication at a UE is described. The apparatus may include a processor, memory coupled with the processor, and instructions stored in the memory. The instructions may be executable by the processor to cause the apparatus to receive, from a core network entity via an access network entity, control information that identifies criteria to use for determining a delivery status of a PDU set that includes multiple PDUs, where the PDU set is associated with an application layer of the UE. The instructions may be further executable by the processor to cause the apparatus to receive at least a portion of the PDU set with the control information. The instructions may be further executable by the processor to cause the apparatus to determine the delivery status of the PDU set based on a value associated with the received portion of the PDU set and a threshold indicated by the criteria, the delivery status indicating whether the PDU set was successfully delivered to the UE.

Another apparatus for wireless communication at a UE is described. The apparatus may include means for receiving, from a core network entity via an access network entity, control information that identifies criteria to use for determining a delivery status of a PDU set that includes multiple PDUs, where the PDU set is associated with an application layer of the UE. The apparatus may further include means for receiving at least a portion of the PDU set with the control information. The apparatus may further include means for determining the delivery status of the PDU set based on a value associated with the received portion of the PDU set and a threshold indicated by the criteria, the delivery status indicating whether the PDU set was successfully delivered to the UE.

A non-transitory computer-readable medium storing code for wireless communication at a UE is described. The code may include instructions executable by a processor to receive, from a core network entity via an access network entity, control information that identifies criteria to use for determining a delivery status of a PDU set that includes multiple PDUs, where the PDU set is associated with an application layer of the UE. The instructions may be further executable by the processor to receive at least a portion of the PDU set with the control information. The instructions may be further executable by the processor to determine the delivery status of the PDU set based on a value associated with the received portion of the PDU set and a threshold indicated by the criteria, the delivery status indicating whether the PDU set was successfully delivered to the UE.

In some examples of the methods, apparatuses, and non-transitory computer-readable media described herein, determining the delivery status of the PDU set may include operations, features, means, or instructions for determining whether the PDU set was successfully delivered to the UE based on the value that includes a quantity of PDUs preceding a first unsuccessfully delivered PDU in the PDU set.

In some examples of the methods, apparatuses, and non-transitory computer-readable media described herein, determining the delivery status of the PDU set may include operations, features, means, or instructions for determining whether the PDU set was successfully delivered to the UE based on the value that includes a quantity of bits preceding a first unsuccessfully delivered bit in the PDU set.

In some examples of the methods, apparatuses, and non-transitory computer-readable media described herein, determining the delivery status of the PDU set may include operations, features, means, or instructions for determining whether the PDU set was successfully delivered to the UE based on the threshold that includes a threshold quantity of PDUs and the value that includes a quantity of PDUs in the received portion of the PDU set.

In some examples of the methods, apparatuses, and non-transitory computer-readable media described herein, determining the delivery status of the PDU set may include operations, features, means, or instructions for determining whether the PDU set was successfully delivered to the UE based on the value that includes a quantity of bits in the received portion of the PDU set and the threshold that includes a threshold quantity of bits.

In some examples of the methods, apparatuses, and non-transitory computer-readable media described herein, receiving the control information may include operations, features, means, or instructions for receiving an indication of the threshold that includes a threshold quantity of PDUs to use for determining the delivery status of the PDU set, where the threshold quantity of PDUs is less than or equal to a total quantity of PDUs in the PDU set.

In some examples of the methods, apparatuses, and non-transitory computer-readable media described herein, receiving the control information may include operations, features, means, or instructions for receiving an indication of the threshold that includes a threshold quantity of bits to use for determining the delivery status of the PDU set, where the threshold quantity of bits is less than or equal to a total quantity of bits in the PDU set.

In some examples of the methods, apparatuses, and non-transitory computer-readable media described herein, receiving the control information may include operations, features, means, or instructions for receiving metadata that indicates a flow type field associated with a PDU in the PDU set, a first sequence number associated with the PDU in the PDU set, a second sequence number associated with the PDU set, a quantity of PDUs in the PDU set, a content criteria field associated with the delivery status of the PDU set, a user plane indicator field associated with the content criteria field, or a combination thereof.

Some examples of the methods, apparatuses, and non-transitory computer-readable media described herein may further include operations, features, means, or instructions for determining whether the metadata includes the first sequence number, the second sequence number, the quantity of PDUs in the PDU set, and the user plane indicator field based on a value of the flow type field.

Some examples of the methods, apparatuses, and non-transitory computer-readable media described herein may further include operations, features, means, or instructions for determining whether the metadata includes the content criteria field based on a value of the user plane indicator field and a value of the flow type field.

In some examples of the methods, apparatuses, and non-transitory computer-readable media described herein, the first sequence number identifies the PDU set and the second sequence number identifies a PDU within the PDU set.

In some examples of the methods, apparatuses, and non-transitory computer-readable media described herein, a first value of the user plane indicator field indicates that the delivery status of the PDU set depends on whether all PDUs in the PDU set were successfully delivered and a second value of the user plane indicator field indicates that the delivery status of the PDU set depends on the content criteria field.

In some examples of the methods, apparatuses, and non-transitory computer-readable media described herein, the content criteria field includes a forward error correction (FEC) information field, a delivery threshold field, or both.

In some examples of the methods, apparatuses, and non-transitory computer-readable media described herein, receiving the control information may include operations, features, means, or instructions for receiving metadata that indicates an applicability field associated with the criteria, a size indicator field, a quantity of PDUs in the PDU set, a quantity of bits in a PDU of the PDU set, a FEC indicator field, a FEC information field associated with the delivery status of the PDU set, a delivery threshold field associated with the delivery status of the PDU set, or a combination thereof.

Some examples of the methods, apparatuses, and non-transitory computer-readable media described herein may further include operations, features, means, or instructions for determining whether the criteria may be defined with respect to PDUs or bits based on a value of the applicability field.

Some examples of the methods, apparatuses, and non-transitory computer-readable media described herein may further include operations, features, means, or instructions for determining whether the metadata indicates the quantity of PDUs in the PDU set based on a value of the size indicator field.

Some examples of the methods, apparatuses, and non-transitory computer-readable media described herein may further include operations, features, means, or instructions for determining whether the metadata includes the FEC information field based on a value of the FEC indicator field.

Some examples of the methods, apparatuses, and non-transitory computer-readable media described herein may further include operations, features, means, or instructions for determining the criteria based on a value of the applicability field, a value of the FEC indicator field, a value of the FEC information field, a value of the delivery threshold field, or a combination thereof.

Some examples of the methods, apparatuses, and non-transitory computer-readable media described herein may further include operations, features, means, or instructions for determining whether the metadata includes the delivery threshold field based on a value of the FEC indicator field and a value of the FEC information field.

In some examples of the methods, apparatuses, and non-transitory computer-readable media described herein, the delivery threshold field indicates a threshold quantity of PDUs if the applicability field may be set to a first value and the delivery threshold field indicates a threshold quantity of bits if the applicability field may be set to a second value.

Some examples of the methods, apparatuses, and non-transitory computer-readable media described herein may further include operations, features, means, or instructions for determining whether the metadata indicates the quantity of bits in the PDU of the PDU set based on a value of the applicability field.

Some examples of the methods, apparatuses, and non-transitory computer-readable media described herein may further include operations, features, means, or instructions for receiving control information indicating whether the criteria may be associated with a dynamic FEC scheme or a static FEC scheme.

In some examples of the methods, apparatuses, and non-transitory computer-readable media described herein, the control information may be included in a packet data convergence protocol (PDCP) header of a PDU in the PDU set.

A method for wireless communication at an access network entity is described. The method may include outputting control information that identifies criteria to use for determining a delivery status of a PDU set that includes multiple PDUs, where the PDU set is associated with an application layer of the access network entity. The method may further include outputting the multiple PDUs in the PDU set with the control information, where the delivery status of the PDU set is based on a threshold indicated by the criteria.

An apparatus for wireless communication at an access network entity is described. The apparatus may include a processor, memory coupled with the processor, and instructions stored in the memory. The instructions may be executable by the processor to cause the apparatus to output control information that identifies criteria to use for determining a delivery status of a PDU set that includes multiple PDUs, where the PDU set is associated with an application layer of the access network entity. The instructions may be further executable by the processor to cause the apparatus to output the multiple PDUs in the PDU set with the control information, where the delivery status of the PDU set is based on a threshold indicated by the criteria.

Another apparatus for wireless communication at an access network entity is described. The apparatus may include means for outputting control information that identifies criteria to use for determining a delivery status of a PDU set that includes multiple PDUs, where the PDU set is associated with an application layer of the access network entity. The apparatus may further include means for outputting the multiple PDUs in the PDU set with the control information, where the delivery status of the PDU set is based on a threshold indicated by the criteria.

A non-transitory computer-readable medium storing code for wireless communication at an access network entity is described. The code may include instructions executable by a processor to output control information that identifies criteria to use for determining a delivery status of a PDU set that includes multiple PDUs, where the PDU set is associated with an application layer of the access network entity. The instructions may be further executable by the processor to output the multiple PDUs in the PDU set with the control information, where the delivery status of the PDU set is based on a threshold indicated by the criteria.

Some examples of the methods, apparatuses, and non-transitory computer-readable media described herein may further include operations, features, means, or instructions for obtaining, from a core network entity, at least a portion of the PDU set.

Some examples of the methods, apparatuses, and non-transitory computer-readable media described herein may further include operations, features, means, or instructions for determining the delivery status of the PDU set based on the obtained portion of the PDU set and the criteria identified by the control information.

In some examples of the methods, apparatuses, and non-transitory computer-readable media described herein, determining the delivery status of the PDU set may include operations, features, means, or instructions for determining whether the PDU set was successfully delivered to the access network entity based on a quantity of PDUs that precede a first unsuccessfully delivered PDU in the PDU set.

In some examples of the methods, apparatuses, and non-transitory computer-readable media described herein, determining the delivery status of the PDU set may include operations, features, means, or instructions for determining whether the PDU set was successfully delivered to the access network entity based on a quantity of bits that precede a first unsuccessfully delivered bit in the PDU set.

In some examples of the methods, apparatuses, and non-transitory computer-readable media described herein, determining the delivery status of the PDU set may include operations, features, means, or instructions for determining whether the PDU set was successfully delivered to the access network entity based on the threshold that includes a threshold quantity of PDUs and a quantity of PDUs in the obtained portion of the PDU set.

In some examples of the methods, apparatuses, and non-transitory computer-readable media described herein, determining the delivery status of the PDU set may include operations, features, means, or instructions for determining whether the PDU set was successfully delivered to the access network entity based on the threshold that includes a threshold quantity of bits and a quantity of bits in the obtained portion of the PDU set.

Some examples of the methods, apparatuses, and non-transitory computer-readable media described herein may further include operations, features, means, or instructions for obtaining an indication of the threshold that includes a threshold quantity of PDUs to use for determining the delivery status of the PDU set, where the threshold quantity of PDUs is less than or equal to a total quantity of PDUs in the PDU set.

Some examples of the methods, apparatuses, and non-transitory computer-readable media described herein may further include operations, features, means, or instructions for obtaining an indication of the threshold that includes a threshold quantity of bits to use for determining the delivery status of the PDU set, where the threshold quantity of bits is less than or equal to a total quantity of bits in the PDU set.

In some examples of the methods, apparatuses, and non-transitory computer-readable media described herein, outputting the control information may include operations, features, means, or instructions for outputting an indication of the threshold that includes a threshold quantity of PDUs to use for determining the delivery status of the PDU set, where the threshold quantity of PDUs is less than or equal to a total quantity of PDUs in the PDU set.

In some examples of the methods, apparatuses, and non-transitory computer-readable media described herein, outputting the control information may include operations, features, means, or instructions for outputting an indication of the threshold that includes a threshold quantity of bits to use for determining the delivery status of the PDU set, where the threshold quantity of bits is less than or equal to a total quantity of bits in the PDU set.

In some examples of the methods, apparatuses, and non-transitory computer-readable media described herein, outputting the control information may include operations, features, means, or instructions for outputting metadata that indicates a flow type field associated with a PDU in the PDU set, a first sequence number associated with the PDU in the PDU set, a second sequence number associated with the PDU set, a quantity of PDUs in the PDU set, a content criteria field associated with the delivery status of the PDU set, a user plane indicator field associated with the content criteria field, or a combination thereof.

In some examples of the methods, apparatuses, and non-transitory computer-readable media described herein, outputting the control information may include operations, features, means, or instructions for outputting metadata that indicates an applicability field associated with the criteria, a size indicator field, a quantity of PDUs in the PDU set, a quantity of bits in a PDU of the PDU set, a FEC indicator field, a FEC information field associated with the delivery status of the PDU set, a delivery threshold field associated with the delivery status of the PDU set, or a combination thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers). It is intended that innovations described herein may be practiced in a wide variety of devices, chip-level components, systems, distributed arrangements, and end-user devices of varying sizes, shapes, and constitution.

8

Figure 4:
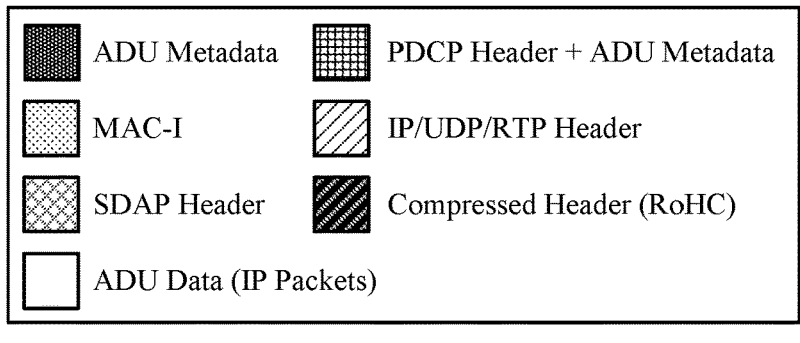

FIG. 4 illustrates an example of a network diagram that supports enhancements to ADU metadata in accordance with one or more aspects of the present disclosure.

Figure 5:
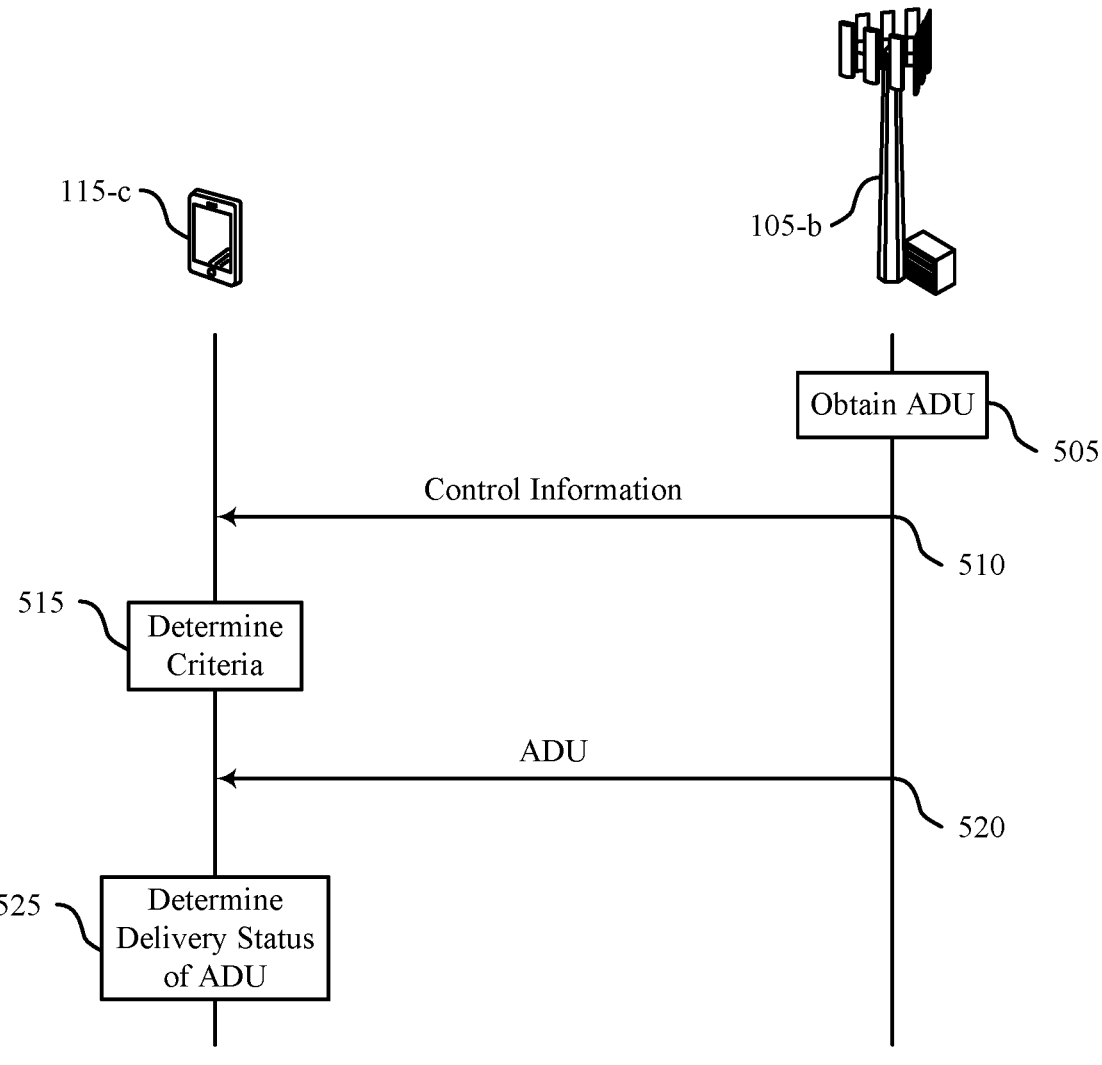

FIG. 5 illustrates an example of a process flow that supports enhancements to ADU metadata in accordance with one or more aspects of the present disclosure.

Figure 6:
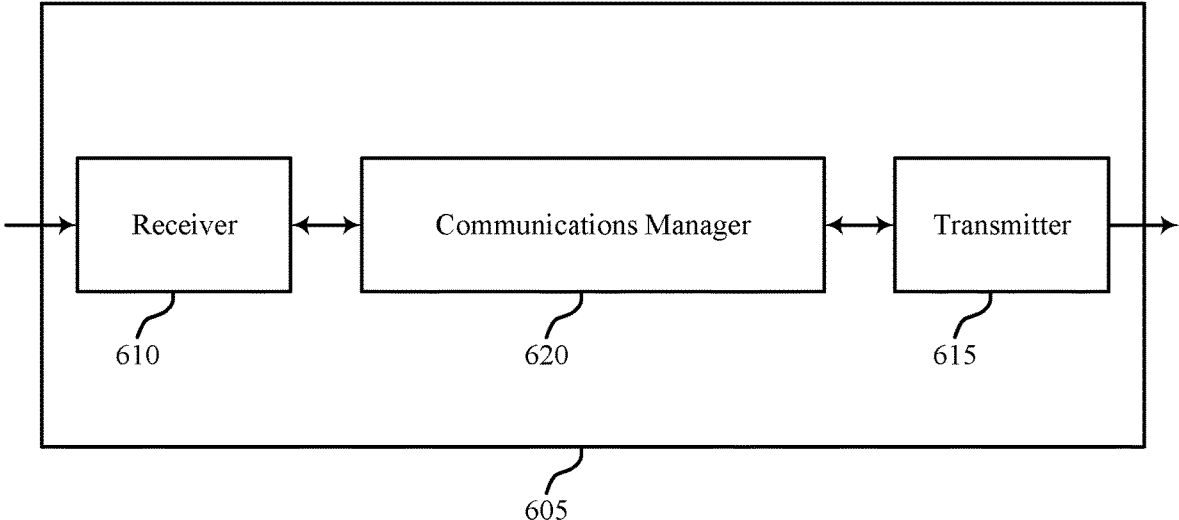
Figure 7:
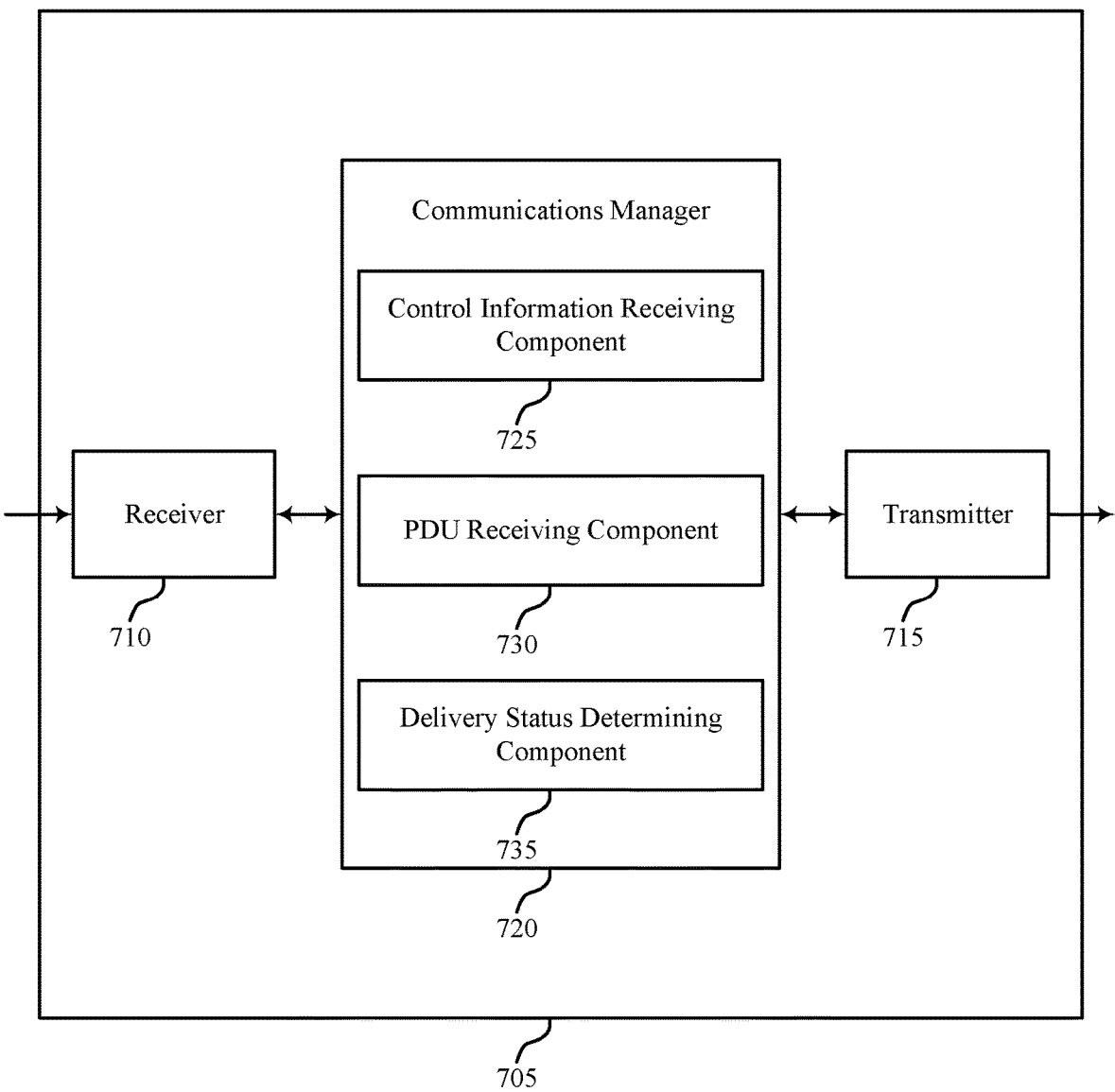

FIGS. 6 and 7 show block diagrams of devices that support enhancements to ADU metadata in accordance with one or more aspects of the present disclosure.

Figure 8:
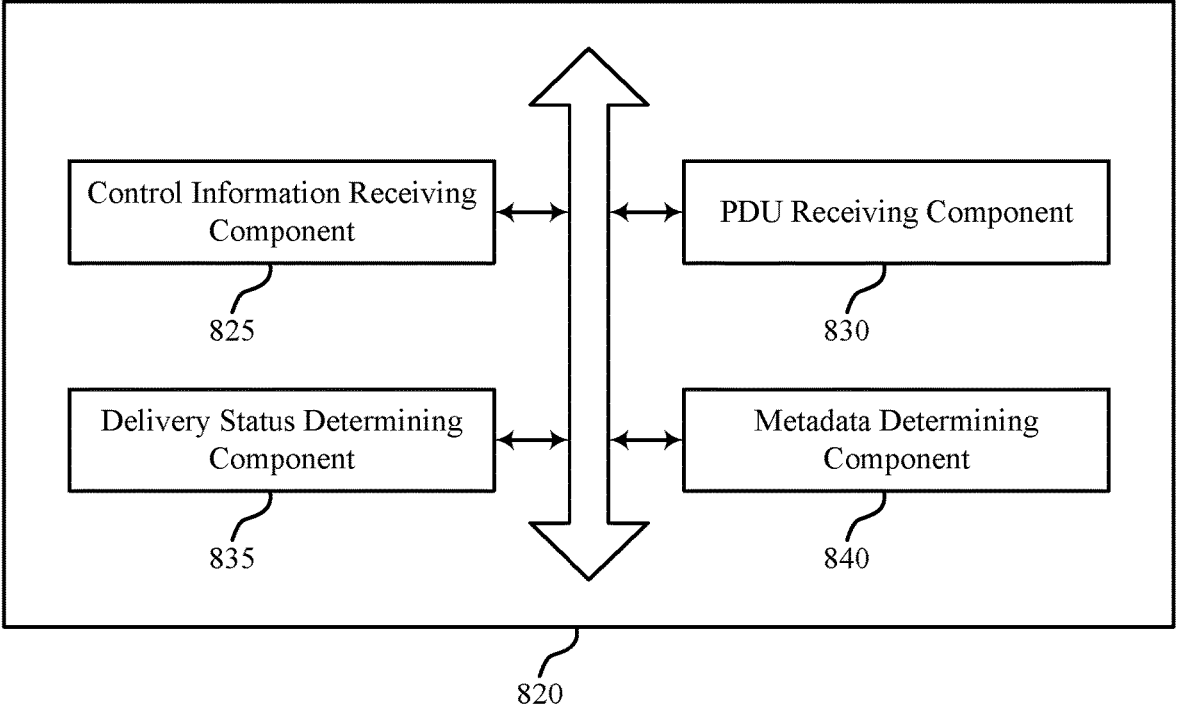
Figure 8:

FIG. 8 shows a block diagram of a communications manager that supports enhancements to ADU metadata in accordance with one or more aspects of the present disclosure.

Figure 9:
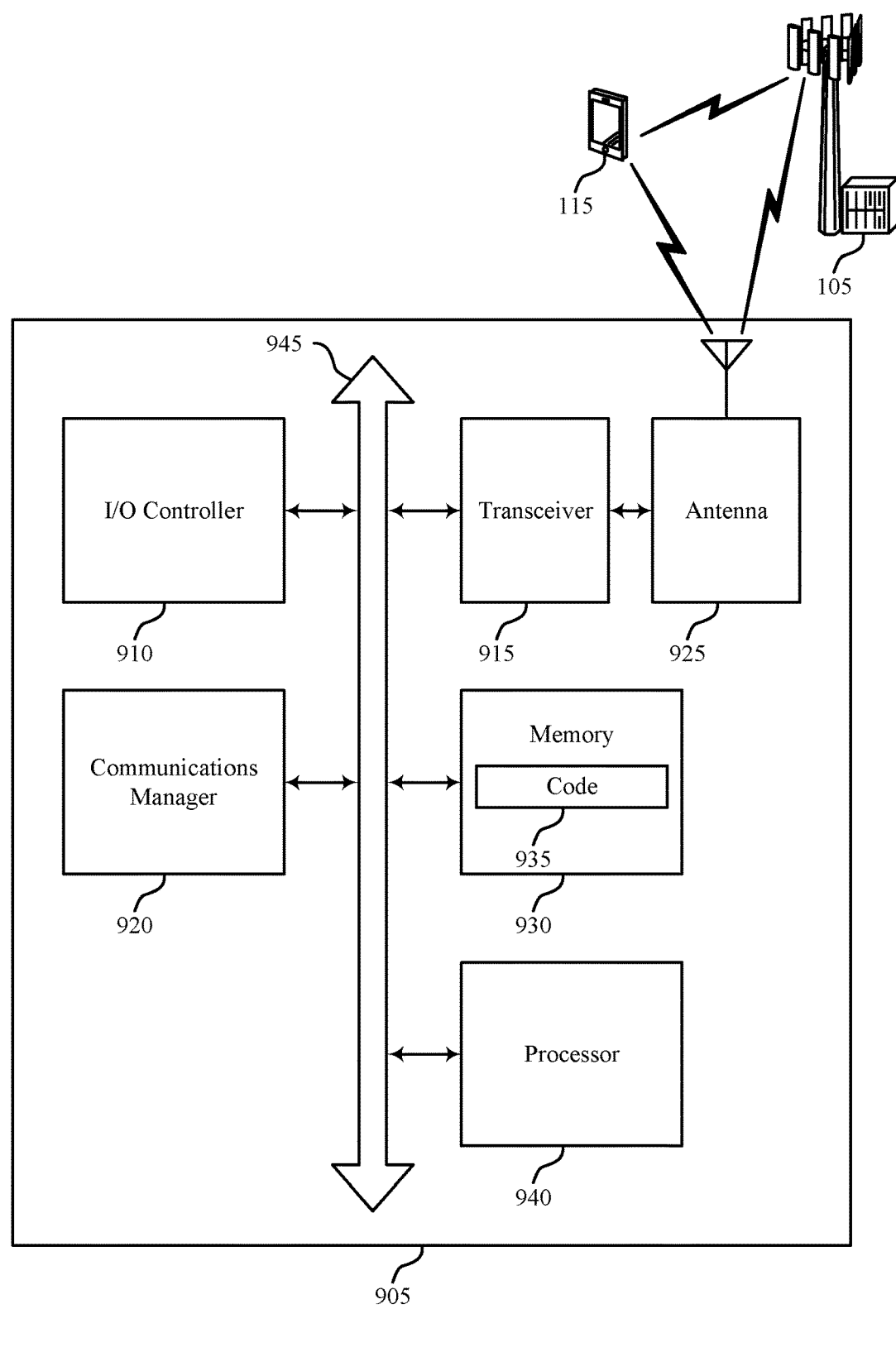

FIG. 9 shows a diagram of a system including a device that supports enhancements to ADU metadata in accordance with one or more aspects of the present disclosure.

Figure 10:
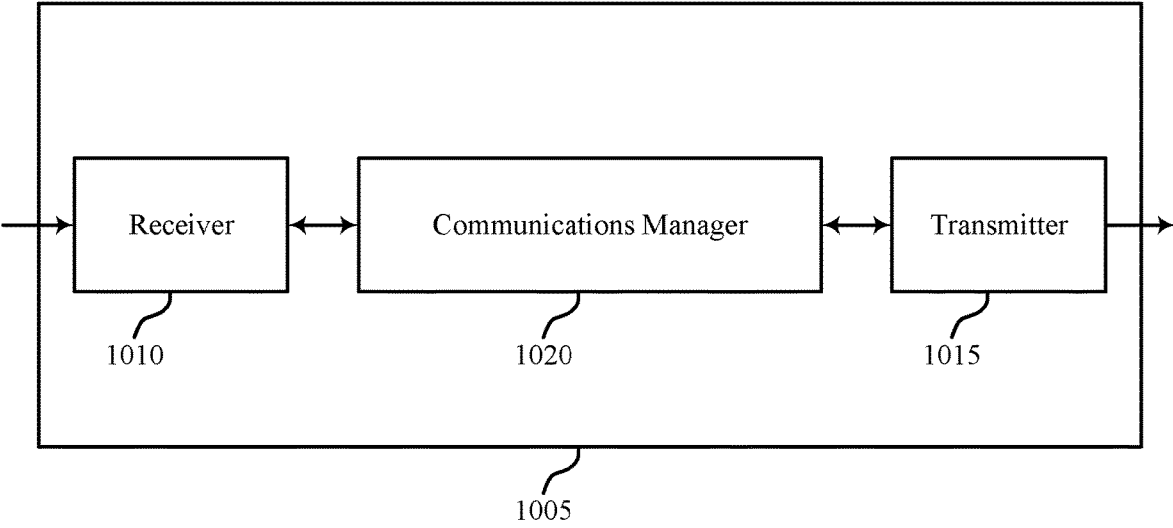
Figure 11:
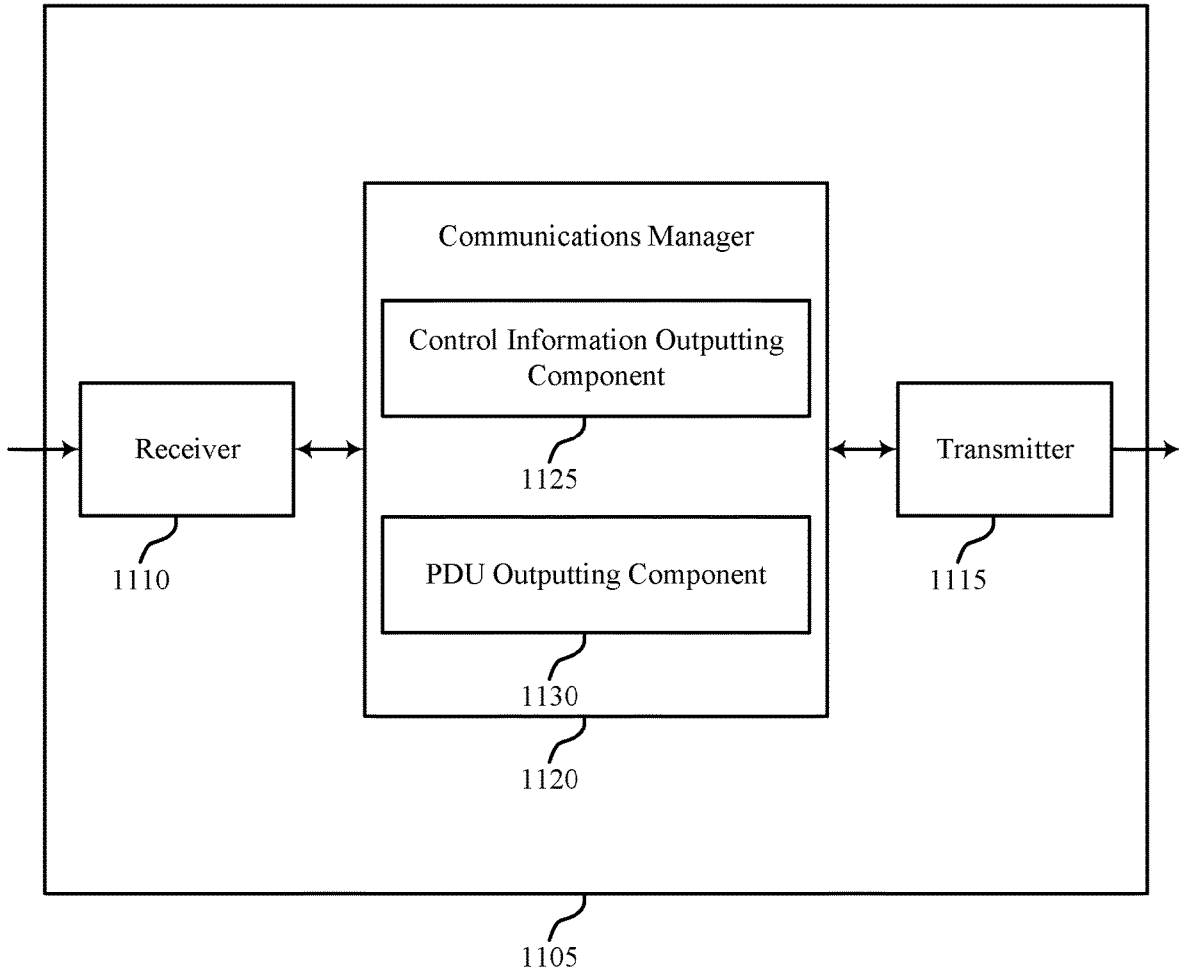

FIGS. 10 and 11 show block diagrams of devices that support enhancements to ADU metadata in accordance with one or more aspects of the present disclosure.

Figure 12:
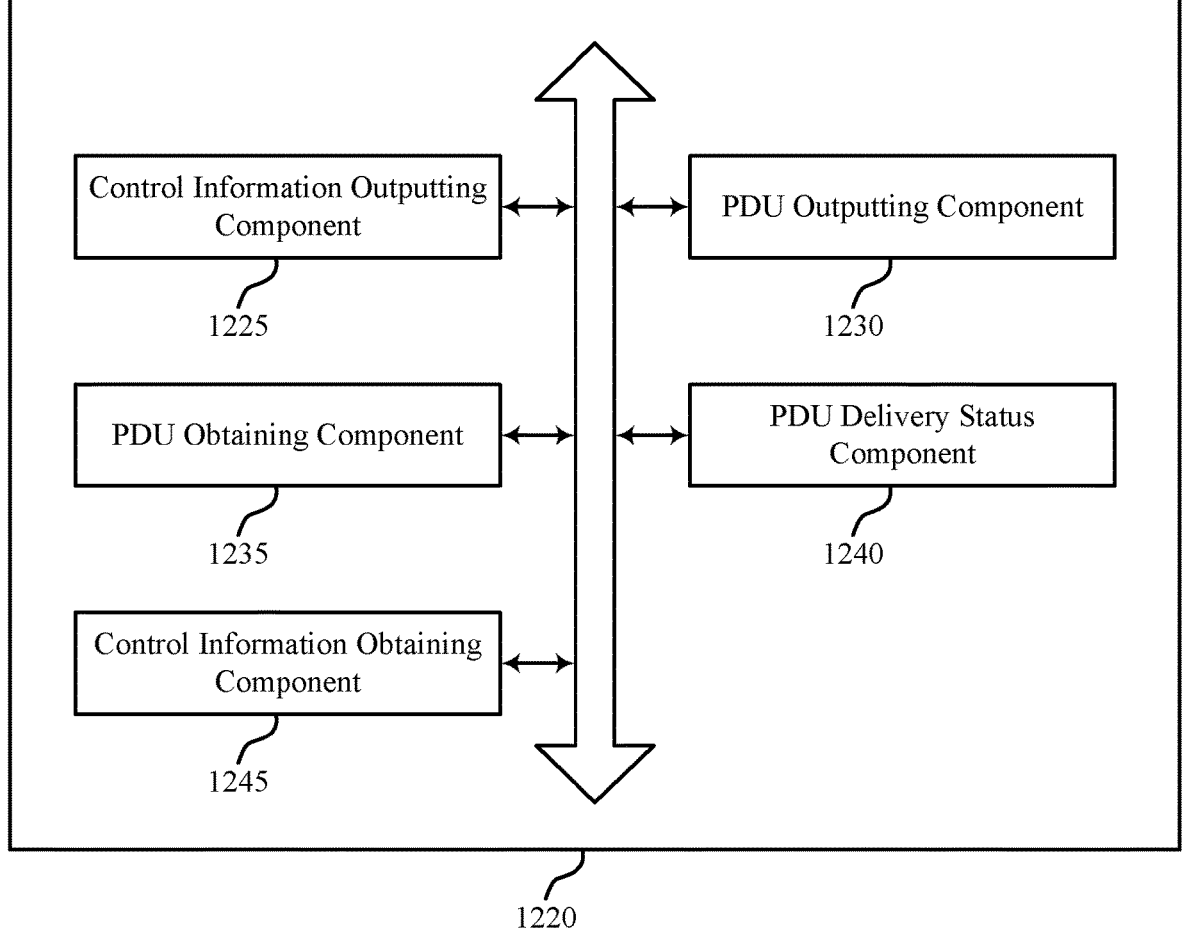
Figure 12:

FIG. 12 shows a block diagram of a communications manager that supports enhancements to ADU metadata in accordance with one or more aspects of the present disclosure.

Figure 13:

FIG. 13 shows a diagram of a system including a device that supports enhancements to ADU metadata in accordance with one or more aspects of the present disclosure.

FIGS. 14 through 17 show flowcharts illustrating methods that support enhancements to ADU metadata in accordance with one or more aspects of the present disclosure.

DETAILED DESCRIPTION

Some wireless communications systems may include various devices such as a user equipment (UE) and a network entity (equivalently referred to as a gNB or a base station). In some cases, a network entity may transmit an application data unit (ADU) to a UE. An ADU (also referred to as a protocol data unit (PDU) set) may include one or more PDUs. The network entity may transmit ADUs in bursts at approximately the same time. ADUs may be routed from an application server to a UE via a user plane function (UPF) and one or more elements of the network entity. Each PDU in an ADU may include metadata that includes information related to the ADU. This metadata can be used to determine whether the ADU was successfully delivered or not. The ADU metadata may be provided by the application server or implicitly determined by a UPF service layer.

ADU metadata may indicate a number of PDUs in an ADU, an ADU sequence number that identifies the ADU, a PDU sequence number that identifies a PDU within the ADU, an ADU burst number, an ADU discard time, and other fields that define rules for determining the delivery status of an ADU. These rules may be configured on a per-PDU basis. For example, the ADU metadata may define the number, ratio, or percentage of PDUs in an ADU that must be received for successful ADU delivery. However, the existing ADU metadata framework may not support bit-level ADU delivery conditions, and may be unsuitable for some dynamic forward error correction (FEC) schemes.

Aspects of the present disclosure support an enhanced ADU metadata field structure that can be used for a wide range of ADU delivery scenarios. The enhanced ADU metadata framework described herein may include one or more ADU content criteria (ACC) fields that can be used to dynamically configure or update ADU delivery conditions. These ACC fields may include an ACC application field, an ADU size indicator (ASI) field, an ADU size field, a PDU size field (a quantity of ADU bits in a PDU), a FEC information indicator (FII) field, an FEC information field, a delivery threshold field (a threshold quantity of bits or PDUs), or a combination thereof. These ACC fields may be included in a packet data convergence protocol (PDCP) header of a PDU. A UE (or any ADU recipient) may determine the delivery status of an ADU based on the criteria specified by these ACC fields.

In some examples, the delivery status of an ADU may depend on a quantity of PDUs or bits that precede a first unsuccessfully delivered PDU or bit of the ADU. In other examples, the delivery status of the ADU may depend on a quantity of successfully received PDUs or bits in the ADU and a threshold quantity of PDUs or bits. The UE may determine whether to determine the delivery status of the ADU with respect to bits or PDUs based on a value of the ACC application field. Some of the ACC fields described herein (such as the ASI field and the FII field) may indicate whether other ACC fields (such as the ASI size field or the FEC information field) are present in the ADU metadata. The flexible ACC framework described herein may be applicable to a wide range of FEC schemes and ADU delivery conditions.

Aspects of the present disclosure may be implemented to realize one or more of the following advantages. The described techniques may improve the flexibility and applicability of existing ADU delivery conditions. For example, a network entity (or other communication device) may dynamically configure or update ADU delivery conditions based on an FEC scheme of a UE (none, static, or dynamic). Likewise, the network entity may configure ADU delivery conditions with respect to bits or PDUs, which may improve the flexibility of the ADU delivery conditions. The enhanced ACC framework described herein can be used for various ADU metadata configurations and deployment scenarios.

Aspects of the disclosure are initially described in the context of wireless communications systems, network diagrams, and process flows. Aspects of the disclosure are further illustrated by and described with reference to apparatus diagrams, system diagrams, and flowcharts that relate to enhancements to ADU metadata.

Figure 1:
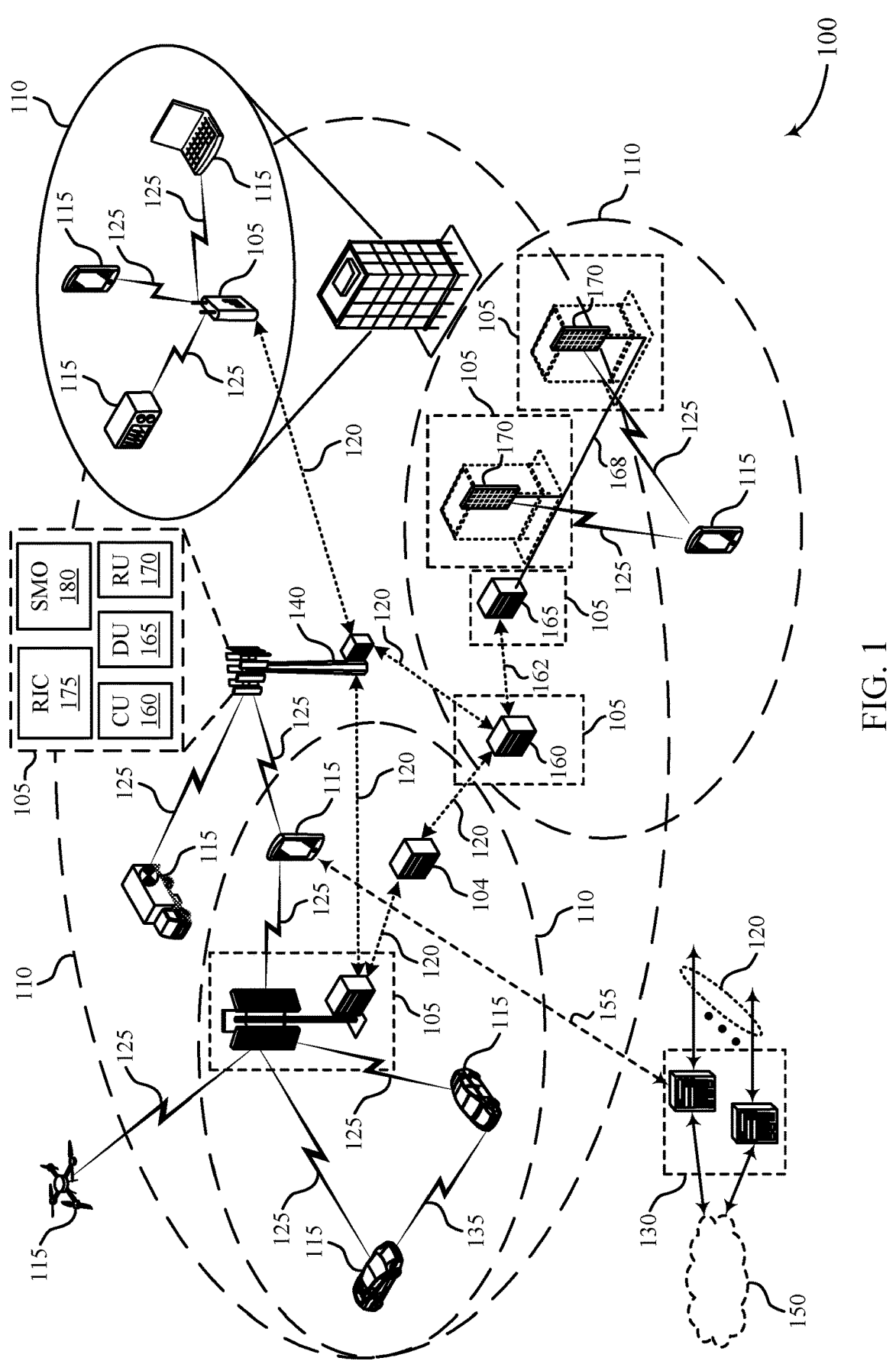
FIG. 1 illustrates an example of a wireless communications system that supports enhancements to application data unit (ADU) metadata in accordance with one or more aspects of the present disclosure.

FIG. 1 illustrates an example of a wireless communications system 100 that supports enhancements to ADU metadata in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node.

In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130).

In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof.

An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack.

In some examples, the CU 160 may host upper protocol layer (e.g., layer 3 (L3), layer 2 (L2)) functionality and signaling (e.g., Radio Resource Control (RRC), service data adaption protocol (SDAP), PDCP). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160.

Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU

165, or an RU 170, while other functions of the protocol layer are performed by a different one of the CU 160, the DU 165, or the RU 170).

A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120).

IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support enhancements to ADU metadata, as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling.

The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, a slot may further be divided into multiple mini-slots associated with one or more symbols. Excluding the cyclic prefix, each symbol period may be associated with one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115.

For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)).

The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), FEC, and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In accordance with the techniques described herein, a UE 115 may receive control information that identifies criteria to use for determining a delivery status of an ADU (also referred to as a PDU set) that includes multiple PDUs. The ADU may be associated with an application layer of the UE 115. Accordingly, the UE 115 may receive at least a portion of the ADU from a network entity 105, and may determine the delivery status of the ADU based on the received portion of the ADU and the criteria identified by the control information. The delivery status of the ADU may refer to whether the ADU was successfully delivered to the UE 115. The delivery status of the ADU may be based on a quantity of bits or PDUs in the received portion of the ADU, a threshold quantity of bits or PDUs (defined by the criteria), or a combination thereof.

Aspects of wireless communications system 100 may be implemented to realize one or more of the following advantages. The techniques described with reference to FIG. 1 may improve the flexibility and applicability of existing ADU delivery conditions. For example, a network entity 105 may dynamically configure or update ADU delivery conditions based on an FEC scheme of a UE 115 (none, static, or dynamic). Additionally or alternatively, the network entity 105 may configure ADU delivery conditions with respect to bits or PDUs, which may improve the flexibility of the ADU delivery conditions. The enhanced ACC framework described herein can be used for a wide range of ADU metadata configurations and deployment scenarios.

Figure 2:
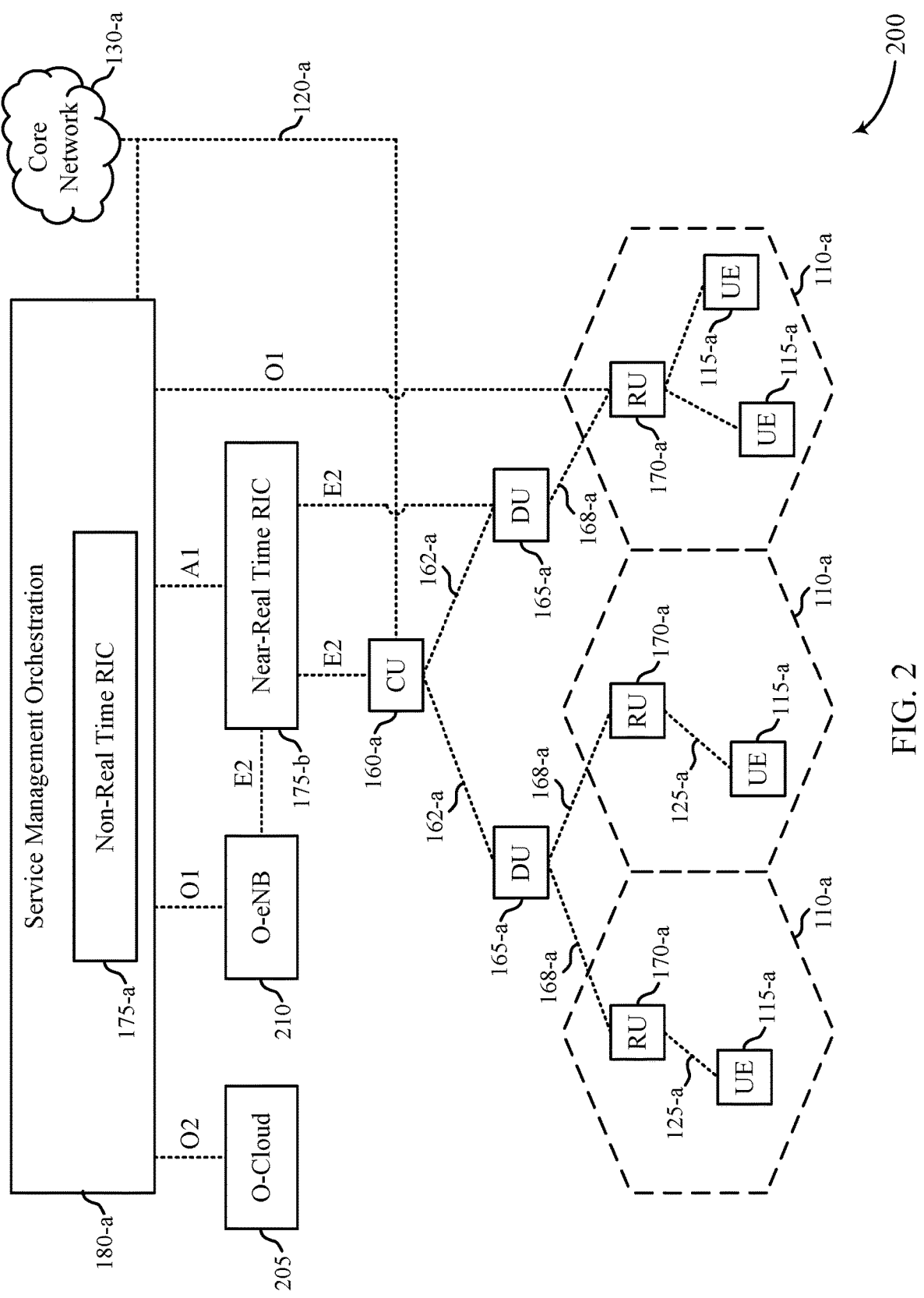
FIG. 2 illustrates an example of a network architecture that supports enhancements to ADU metadata in accordance with one or more aspects of the present disclosure.

FIG. 2 illustrates an example of a network architecture 200 (e.g., a disaggregated base station architecture, a disaggregated RAN architecture) that supports enhancements to application data unit metadata in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*b* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via 01) or via generation of RAN management policies (e.g., A1 policies).

In accordance with the techniques described herein, the UE 115-b may receive control information that identifies criteria to use for determining a delivery status of an ADU (also referred to as a PDU set) that includes multiple PDUs. The ADU may be associated with an application layer of the UE 115-b. Accordingly, the UE 115-b may receive at least a portion of the ADU from a network entity (e.g., the O-eNB 210), and may determine the delivery status of the ADU based on the received portion of the ADU and the criteria identified by the control information. The delivery status of the ADU may refer to whether the ADU was successfully delivered to the UE 115-b. The delivery status of the ADU may be based on a quantity of bits or PDUs in the received portion of the ADU, a threshold quantity of bits or PDUs (defined by the criteria), or a combination thereof.

Aspects of network architecture 200 may be implemented to realize one or more of the following advantages. The techniques described with reference to FIG. 2 may improve the flexibility and applicability of existing ADU delivery conditions. For example, a network entity (e.g., the O-eNB 210) may dynamically configure or update ADU delivery conditions based on an FEC scheme of the UE 115-b (none, static, or dynamic). Additionally or alternatively, the network entity may configure ADU delivery conditions with respect to bits or PDUs, which may improve the flexibility of the ADU delivery conditions. The enhanced ACC framework described herein can be used for a wide range of ADU metadata configurations and deployment scenarios.

Figure 3:
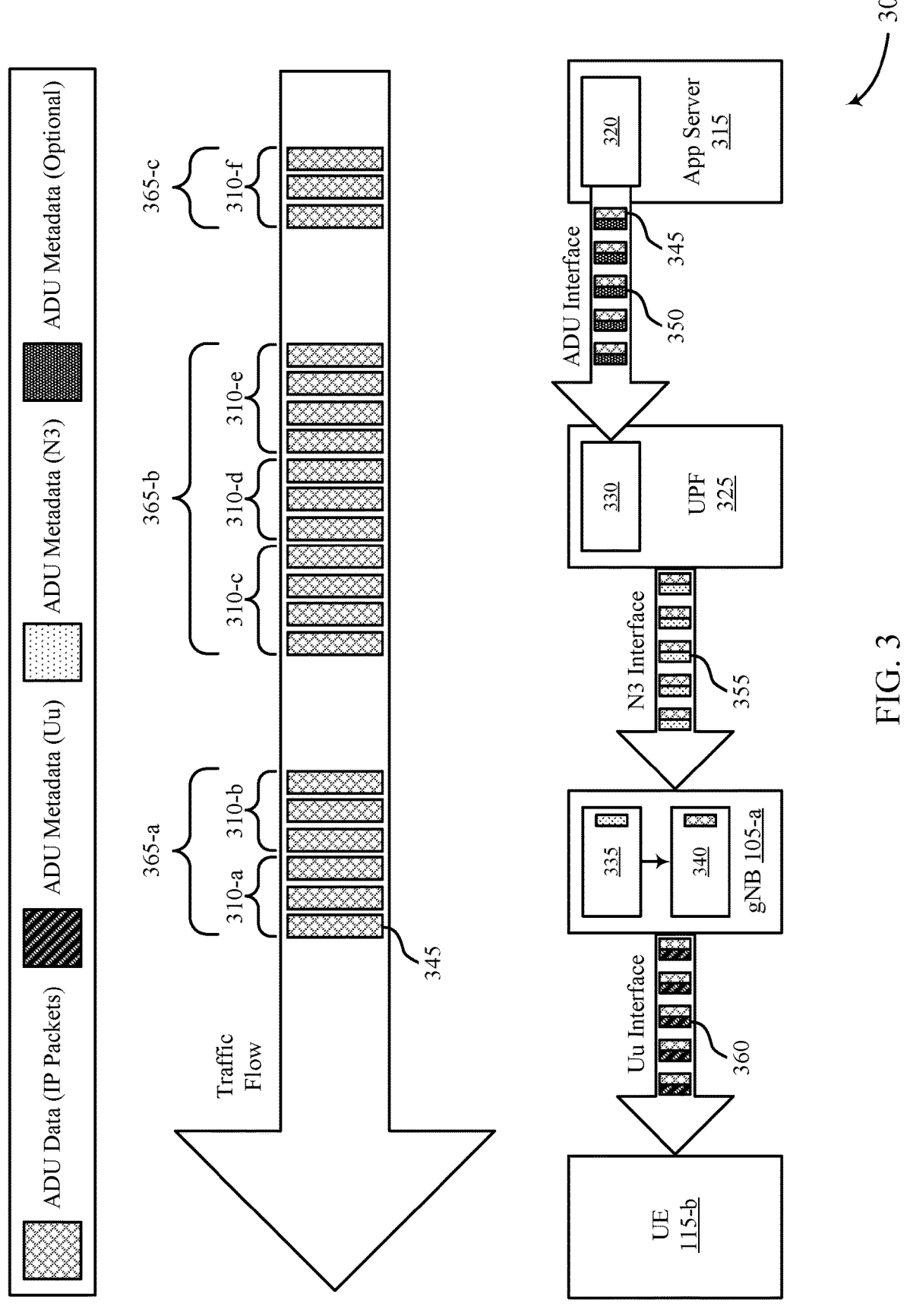
FIG. 3 illustrates an example of a wireless communications system that supports enhancements to ADU metadata in accordance with one or more aspects of the present disclosure.

FIG. 3 illustrates an example of a wireless communications system 300 that supports enhancements to ADU metadata in accordance with one or more aspects of the present disclosure. The wireless communications system 300 may implement or be implemented by aspects of the wireless communications system 100 or the network architecture 200. For example, the wireless communications system 300 may include a UE 115-b and a network entity 105-a (also referred to as a gNB or a base station), which may be examples of corresponding devices described with reference to FIG. 1. The network entity 105-a may include an ADU schedule control unit 335 and a scheduler 340. In the wireless communications system 300, one or more ADUs may be transmitted from an application server 315 to the UE 115-b by means of a UPF 325 and the network entity 105-a.

Applications may process (consume) data in ADUs rather than IP packets. An ADU is a set of packets jointly processed by an application. A burst is a set of ADUs generated by an application at approximately the same time. In the example of FIG. 3, a burst 365-a may include an ADU 310-a and an ADU 310-b, a burst 365-b may include an ADU 310-c, an ADU 310-d, and an ADU 310-e, and a burst 365-c may include an ADU 310-f. As an example, there may be one video frame (or a slice of a video frame) per burst. Aspects of the present disclosure support ADU awareness at the network entity 105-a (gNB) and the UE 115-b. The wireless communications system 300 illustrates an exemplary traffic flow for downlink ADU metadata. However, the ADU metadata principles described herein are applicable to uplink as well.

For each ADU 310 delivered by an application 320 on the application server 315, information related to the ADU 310 may be passed to the RAN and the UE 115-b. This information may be equivalently referred to herein as ADU metadata or control information. A service layer 330 of the UPF 325 may identify the ADU 310 and signal the ADU metadata to the RAN (the network entity 105-a) with the associated IP packets 345. The ADU metadata may include Uu metadata 360, N3 metadata 355, and optional metadata 350. The ADU metadata may be explicitly provided by the application server 315 or implicitly determined (learned) by the service layer 330 of the UPF 325 (from traffic). The service layer 330 may decouple ADU signaling from the application server 315 to the UPF 325 and ADU signaling within a 5G system (from the UPF 325 to the RAN). Some exemplary ADU metadata fields are listed in Table 1.

TABLE 1

| ADU Metadata Elements | |
| --- | --- |
| Element | Description |
| ADU-Based Service Flow Flag | Signals whether an IP packet belongs to an ADU-based service flow |
| ADU Sequence Number | Running number that identifies an ADU that an IP packet belongs to |
| ADU Burst Number | Running number that identifies a burst of an ADU that an IP packet belongs to |
| ADU Size | Number of bits in an ADU |
| Number of IP Packets | Number of IP packets in an ADU |
| IP Sequence Number | Number that unambiguously identifies an IP packet inside an ADU |
| ADU Content Policy | Minimum % of ADU bits required for successful ADU delivery when ADU is FEC-protected. Some applications can use dynamic FEC |
| ADU Discard Time | Maximum time that an ADU can be waiting for transmission at source before being discarded |

In some cases, however, the ADU metadata elements shown in Table 1 may not support different ADU metadata configurations or prioritization of ADUs 310 inside a data radio bearer (DRB). The enhanced ADU metadata structure described herein supports a large number of ADU deployment scenarios and ADU prioritization mechanisms. Elements of this enhanced ADU metadata framework are shown in Tables 2 and 3.

TABLE 2

| Enhanced ADU Metadata Framework | | | |
|---|---|---|---|
| Element | Definition | Values | Presence |
| ADU Indicator (AI) | Signals if a PDU belongs to an ADU-based service flow | 0: PDU belongs to a PDU-based flow. Other elements are not present<br>1: PDU belongs to an ADU-based flow. Other elements are present | Mandatory |
| ADU Sequence Number | Running number that identifies an ADU that a PDU belongs to | $[0 - (N_1 - 1)]$, where $N_1$ is fixed | Present if AI = 1 |
| PDU Sequence Number | Running Number that identifies the PDU inside an ADU | $[0 - (N_2 - 1)]$, where $N_2$ is configurable<br>Sequence number of the first PDU in the ADU is 0 | Present if AI = 1 |
| Number of PDUs | Number of PDUs in an ADU | $[0 - N_2]$, where $N_2$ is configurable<br>0 signals that the number of PDUs is unknown<br>$N_2$ (or the last bit) signals that a PDU is the last PDU of the ADU<br>Any value other than a reserved value (e.g., $[1 - (N_2 - 1)]$) is a valid number of PDUs | Present if AI = 1 |
| ACC - User Plane Indicator (ACCUPI) | Signals if ACC - User Plane structure is present | 0: ACC - User Plane is not present<br>1: ACC - User Plane is present<br>If ACCUPI = 0, all PDUs in an ADU must be delivered | Present if AI = 1 |
| ACC - User Plane | Information about ADU Content Criteria | Structure shown in Table 3 | Present if AI = 1 and ACCUPI = 1 |
| FEC Information | Conditions for an ADU delivery | 0: All PDUs until first PDU not delivered<br>1: Number of PDUs to be delivered | Mandatory |
| Number of PDUs to be delivered | Number of PDUs for successful delivery | $[1 - N_2]$ | Present if FEC Information = 1 |

The parameter N2 listed in Table 2 may refer to the quantity of PDUs in an ADU 310, whereas the parameter $N_1$ may refer to a fixed (constant) integer. Elements of the ACC—User Plane structure are listed in Table 3.

TABLE 3

| ACC - User Plane Fields | | | |
|---|---|---|---|
| Element | Definition | Values | Presence |
| FEC Information | Conditions for an ADU delivery | 0: All PDUs until first PDU not delivered<br>1: Number of PDUs to be delivered | Mandatory |
| Number of PDUs to be delivered | Number of PDUs of an ADU that must be delivered | $[1 - N_2]$ | Present if FEC Information = 1 |

Various ADU deployment scenarios (and corresponding metadata requirements) are listed in Table 4. In some of the exemplary scenarios listed in Table 4, the size of an ADU 310 (the number of PDUs in the ADU 310) is known at the source (e.g., the device transmitting the ADU 310). In other scenarios, the ADU size is unknown at the source.

TABLE 4

| ADU Deployment Scenarios | |
| --- | --- |
| Scenario | Required Information |
| Size of ADU: Unknown at source | ADU sequence number |
| | PDU sequence number |
| FEC: None | Last PDU of ADU |
| Size of ADU: Known at source | ADU sequence number |
| FEC: None | PDU sequence number |
| | Number of PDUs in ADU |
| Size of ADU: Known at source | ADU sequence number |
| FEC: Static | PDU sequence number |
| ACC Applicability: PDU | Number of PDUs in ADU |
| Size of ADU: Known at source | ADU sequence number |
| FEC: Dynamic | PDU sequence number |
| ACC Applicability: PDU | Number of PDUs in ADU |
| | ACC: All PDUs until first PDU not delivered or number of PDUs to be delivered |
| Size of ADU: Known at source | ADU sequence number |
| FEC: Static | PDU sequence number |
| ACC Applicability: Bit | Number of PDUs in ADU |
| | ADU Size |
| | Number of ADU bits in PDU |
| Size of ADU: Known at source | ADU sequence number |
| FEC: Dynamic | PDU sequence number |
| ACC Applicability: Bit | Number of PDUs in ADU |
| | ACC: All PDUs until first PDU not delivered or number of PDUs to be delivered |
| | Number of ADU bits in PDU |

For scenarios where static FEC is applied, the ACC may be signaled by the control plane, and may be applicable to all ADUs 310. For scenarios where dynamic FEC is applied, ACC may be signaled as a part of the ADU metadata, and may apply to each ADU 310. For scenarios where ACC is applicable to PDUs, the ACC may be equivalently referred to as ADU content policy (listed in Table 1) for consistency with the control plane.

FIG. 4 illustrates an example of a network diagram 400 that supports enhancements to ADU metadata in accordance with one or more aspects of the present disclosure. The network diagram 400 may implement or be implemented by aspects of the wireless communications system 100 or the wireless communications system 300. For example, the network diagram 400 may include an application server 445, which may be an example of the application server 315 described with reference to FIG. 3. Similarly, the network diagram 400 may include a UPF 450, which may be an example of the UPF 325 described with reference to FIG. 3. The network diagram 400 may also include a gNB-CU-UP 455 and a gNB-DU 460, which may be examples of aspects of a network entity 105 described with reference to FIGS. 1 and 3.

In the example of FIG. 4, the application server 445 may apply FEC and IP packetization on IP packets 405. This may result in an ADU with an ADU size 410. The application server may append one or more IP, user datagram protocol (UDP) and real-time transport (RTP) headers 415 to the ADU. The UPF 450 may append or otherwise include ADU metadata 420 for the ADU. The gNB-CU-UP 455 may add an SDAP header 425 to the ADU before implementing Robust Header Compression (RoHC), integrity protection, and ciphering on the ADU by adding a compressed header 430 and a MAC-I 435 to the ADU. Once ciphered, the gNB-CU-UP 455 may add a PDCP header and ADU metadata 440 to the ADU. Accordingly, the gNB-CU-UP 455 may transmit the ADU to the gNB-DU 460.

In some of the scenarios listed in Table 4, users of the ACC may need to count the bits of an ADU inside each PDU of the ADU to check if the ACC is met. For example, ACC users may need to count bits when there is an N-to-1 mapping between PDCP PDUs, when FEC is implemented before IP packetization, or when there is a non-uniform IP packet size inside one ADU. FIG. 4 illustrates an exemplary procedure for counting ADU bits. For example, users of the ACC (the gNB-DU 460) may need to determine the number of bits inside each RLC service data unit (SDU). However, due to various IP, UDP, and RTP headers, RoHC, and ciphering, the gNB-DU 460 may be unable to determine this number without additional information. Thus, ADU metadata may be enhanced to carry this information.

Although the example of FIG. 4 is applicable to downlink ADU transmission, it is to be understood that the techniques described herein are equally applicable to uplink ADU transmission. In accordance with aspects of the present disclosure, the existing ADU metadata framework may be enhanced to include additional elements shown in Table 5.

TABLE 5

| Enhanced ADU Metadata Structure | | | |
| --- | --- | --- | --- |
| Element | Definition | Values | Presence |
| ADU Indicator (AI) | Signals if a PDU belongs to an ADU-based service flow | 0: PDU belongs to a PDU-based flow. Other elements are not present<br>1: PDU belongs to an ADU-based flow. Other elements are present | Mandatory |
| ADU Sequence Number | Running number that identifies an ADU that a PDU belongs to | $[0 - (N_1 - 1)]$, where $N_1$ is to be determined | Present if AI = 1 |
| PDU Sequence Number | Running Number that identifies a PDU inside an ADU | $[0 - (N_2 - 1)]$, where $N_2$ is configurable<br>Sequence number of the first PDU in the ADU is 0 | Present if AI = 1 |
| Number of PDUs | Number of PDUs in an ADU | $[0 - N_2]$, where $N_2$ is configurable<br>0 signals that the number of PDUs is unknown | Present if AI = 1 |

TABLE 5-continued

| | Enhanced ADU Metadata Structure | | |
| --- | --- | --- | --- |
| Element | Definition | Values | Presence |
| | | $N_2$ (or the last bit) signals that a PDU is the last PDU of the ADU Any value other than a reserved value (e.g., $[1 - (N_2 - 1)]$) is a valid number of PDUs | |
| ACCUPI | Signals if ACC - User Plane structure is present | 0: ACC - User Plane is not present 1: ACC - User Plane is present If ACCUPI = 0, all PDUs of an ADU must be delivered | Present if AI = 1 |
| ACC - User Plane | Information about ADU Content Criteria | Structure shown in Table 6 | Present if AI = 1 and ACCUPI = 1 |
| FEC Information | Conditions for an ADU delivery | 0: All PDUs until first PDU not delivered 1: Number of PDUs to be delivered | Mandatory |
| Number of PDUs to be delivered | Number of PDUs of an ADU that must be delivered | $[1 - N_2]$ | Present if FEC Information = 1 |

To enable users of the ACC (the gNB-DU 460) to count ADU bits inside a PDU of an ADU, a new element (Number of ADU bits in PDU) may be added to the ACC—User Plane field structure. To inform the user of the ACC if PDUs or bits of the ADU are to be counted, a new element (ACC Application) may be added to the ACC—User Plane field structure. To make the presence of some elements conditional to the scenario that is targeted (and to reduce signaling overhead), several presence flags may be added to the ACC—User Plane field structure. These flags may include an ACCUPI field, an ASI field, and an FII field. Aspects related to these new ACC—User Plane fields are listed in Table 6.

The parameter N3 listed in Table 6 may refer to the total quantity of bits in an ADU, while the parameter N4 may refer to the quantity of bits in a PDU of an ADU. To improve applications that use dynamic FEC, a new element (FEC information) may be introduced to differentiate conditions for successful ADU delivery. This element may indicate whether the delivery status of an ADU is based on a quantity of PDUs or bits that precede a first PDU or bit in error or a number of PDUs or bits to be delivered. Additional information related to these ADU metadata elements is listed in Table 6. For most FEC encoding schemes, the basic unit is a symbol. To reduce overhead, the units of these parameters may be changed from bits to symbols.

TABLE 6

| | Enhanced ACC - User Plane Field Structure | | |
| --- | --- | --- | --- |
| Element | Definition | Values | Presence |
| ACC Application | Signals if ACC applies to packets or to bits | 0: Packets (PDUs) 1: Bits | Mandatory |
| ASI | Signals if ADU Size is present | 0: ADU Size is not present 1: ADU Size is present | Mandatory |
| ADU Size | Number of bits in an ADU | $[1 - N_3]$, where $N_3$ is configurable | Present if ASI = 1 |
| Number of ADU bits in PDU | Number of bits of an ADU that are inside a PDU (excluding all headers) | $[1 - N_4]$, where $N_4$ is to be determined $N_4 < 12{,}000$ | Present if ACC Application = 1 |
| FII | Signals if FEC Information is present | 0: FEC Information is not present 1: FEC Information is present | Mandatory |
| FEC Information | Conditions for an ADU delivery | 0: All PDUs or bits until first PDU not delivered 1: Number of PDUs or bits to be delivered The differentiation between PDUs and bits is determined from ACC Application | Present if FII = 1 |
| Number of PDUs or bits to be delivered | Number of PDUs or bits of an ADU that must be delivered | $[1 - N_2]$ if ACC Application = 0 $[1 - N_3]$ if ACC Application = 1 | Present if FII = 0 and FEC Information = 1 |

TABLE 7

| | | Scenario | | | | | |
|---|---|---|---|---|---|---|---|
| | Element | 1 | 2 | 3 | 4 | 5 | 6 |
| | AI | 1 | 1 | 1 | 1 | 1 | 1 |
| | ADU Sequence Number | X | X | X | X | X | X |
| | PDU Sequence Number | X | X | X | X | X | X |
| | Number of PDUs | X | X | X | X | X | X |
| | ACCUPI | 0 | 0 | 1 | 1 | 1 | 1 |
| ACC-User Plane Fields | ACC Application | — | — | 0 | 0 | 1 | 1 |
| | ASI | — | — | 0 | 0 | 1 | 0 |
| | ADU Size | — | — | — | — | X | — |
| | Number of ADU bits in PDU | — | — | — | — | X | X |
| | FII | — | — | 0 | 1 | 0 | 1 |
| | FEC Information | — | — | — | X | — | X |
| | Number of PDUs or Bits to be Delivered | — | — | — | Depends on FEC Information | — | Depends on FEC Information |
| | Delivery | All PDUs | All PDUs | PDUs until static ACC is met | PDUs until dynamic ACC is met | Bits until static ACC is met | Bits until dynamic ACC is met |

Table 7 illustrates various scenarios and the associated ADU metadata fields for each scenario. In scenario 1, no FEC is used and the ADU Size element is not provided. In scenario 2, no FEC is used and the ADU Size element is provided. In scenario 3, static FEC is used and the ACC is defined with respect to PDUs (ACC Application=0). In scenario 4, dynamic FEC is used and the ACC is defined with respect to PDUs (ACC Application=0). In scenario 5, static FEC is used and the ACC is defined with respect to bits (ACC Application=0). In scenario 6, dynamic FEC is used and the ACC is defined with respect to bits (ACC Application=0). In scenario 1, the Number of PDUs element may indicate a value of N2 for the last PDU and a value of 0 for all other PDUs. For scenarios 4 and 6, the Number of PDUs or Bits to be Delivered element may be included if the FEC Information element has a value of 1, and may be excluded if the FEC Information element has a value of 0.

FIG. 5 illustrates an example of a process flow 500 that supports enhancements to ADU metadata in accordance with one or more aspects of the present disclosure. The process flow 500 may implement or be implemented by aspects of the wireless communications system 100 or the wireless communications system 300. For example, the process flow 500 may include a UE 115-*c* and a network entity 105-*b* (which may also be or be referred to as an access network entity herein in some examples), which may be examples of corresponding devices described with reference to FIGS. 1 and 3. In the following description of the process flow 500, operations between the UE 115-*c* and the network entity 105-*b* may be added, omitted, or performed in a different order (with respect to the exemplary order shown).

At 505, the network entity 105-*b* may obtain an ADU from an application server (e.g., the application server 315 described with reference to FIG. 3) by means of a UPF (e.g., the UPF 325 described with reference to FIG. 3) or another core network entity. The ADU may be associated with an application layer of the network entity 105-*b*. The ADU may include data (IP packets) and control information (metadata). In some examples, the ADU (equivalently referred to as a PDU set) may be transmitted with other ADUs in a burst (at approximately the same time). Although described in the context of downlink ADU transmission from the network entity 105-*b* to the UE 115-*c*, it is to be understood that the techniques and operations described herein are equally applicable to uplink ADU transmission from the UE 115-*c* to the network entity 105-*b*.

At 510, the network entity 105-*b* may transmit the control information to the UE 115-*c*. The network entity 105-*b* may include the control information in a PDCP header of a PDU in the ADU. The control information may include an AI field, an ADU sequence number, a PDU sequence number, an ADU size field, an ACCUPI field, one or more ACC user plane fields, or a combination thereof. The one or more ACC user plane fields may indicate criteria to use for determining the delivery status of the ADU. For example, the ACC user plane fields may include an ACC application field, an ASI field, an ADU size field, a PDU size field, an FII field, an FEC information field, a delivery threshold field, or any combination thereof.

The AI field may indicate whether a PDU belongs to an ADU service flow or a PDU service flow. If the PDU belongs to an ADU service flow, the ADU sequence number may identify which ADU includes the PDU, while the PDU sequence number may identify the respective position of the PDU within the ADU. The ADU size field may indicate a quantity of PDUs in the ADU. The UE 115-*c* may determine whether the control information includes the ACC user plane fields based on a value of the ACCUPI field. If the ACC user plane fields are excluded from the control information, the delivery status of the ADU may depend on whether the UE 115-*c* successfully received all PDUs in the ADU.

The ACC application field may indicate whether the criteria are defined with respect to bits or PDUs (packets). The ADU size field may indicate the quantity of bits in the ADU. The UE 115-c may determine whether the control information includes the ADU size field based on a value of the ASI field. The PDU size field may indicate the quantity of ADU bits in a PDU of the ADU (excluding all headers). The FEC information field may indicate conditions for successful ADU delivery. The UE 115-c may determine whether the control information includes the FEC information field based on a value of the FII field. The delivery threshold field may indicate a threshold quantity of PDUs or bits for successful ADU delivery. The UE 115-c may determine whether the control information includes the delivery threshold field based on a value of the FEC information field.

At 515, the UE 115-c may determine the criteria based on values of the ACC user plane fields (if present). For example, the criteria may be defined with respect to bits if the ACC application field is set to a first value. Otherwise, the criteria may be defined with respect to PDUs. If the FEC information field is set to a first value, the delivery status of the ADU may depend on a quantity of successfully received bits or PDUs that precede a first unsuccessfully delivered bit or PDU in the ADU. Otherwise, the delivery status of the ADU may depend on a threshold quantity of bits or PDUs indicated by the delivery threshold field. In some examples, the criteria may correspond to an FEC scheme of the UE 115-c (none, static, or dynamic).

At 520, the UE 115-c may receive at least a portion of the ADU (one or PDUs or bits) from the network entity 105-b (e.g., with the control information). At 525, the UE 115-c may determine the delivery status of the ADU based on the received portion of the ADU and the criteria indicated by the control information. For example, if the delivery status of the ADU depends on a threshold quantity of bits indicated by the delivery threshold field, the UE 115-c may determine that the ADU was successfully delivered if a quantity of bits in the received portion of the ADU exceeds the threshold quantity of bits. The techniques and operations described with reference to FIG. 5 may support more flexible ADU delivery conditions, among other benefits.

FIG. 6 shows a block diagram 600 of a device 605 that supports enhancements to ADU metadata in accordance with one or more aspects of the present disclosure. The device 605 may be an example of aspects of a UE 115, as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to enhancements to ADU metadata). Information may be passed on to other components of the device 605. The receiver 610 may utilize a single antenna or multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to enhancements to ADU metadata). In some examples, the transmitter 615 may be co-located with a receiver 610 in a transceiver module. The transmitter 615 may utilize a single antenna or multiple antennas.

The communications manager 620, the receiver 610, the transmitter 615, or various combinations thereof or various components thereof may be examples of means for performing various aspects of enhancements to ADU metadata, as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations, as described herein.

The communications manager 620 may support wireless communication at a UE (the device 505) in accordance with examples disclosed herein. For example, the communications manager 620 may be configured as or otherwise support a means for receiving, from a core network entity (e.g., a UPF) via an access network entity (e.g., a base station or DU), control information that identifies criteria to use for determining a delivery status of a PDU set that includes multiple PDUs, where the PDU set is associated with an application layer of the UE. The communications manager 620 may be configured as or otherwise support a means for receiving at least a portion of the PDU set with the control information. The communications manager 620 may be configured as or otherwise support a means for determining the delivery status of the PDU set based on a value associated with the received portion of the PDU set and a threshold indicated by the criteria, the delivery status indicating whether the PDU set was successfully delivered to the UE.

By including or configuring the communications manager 620 in accordance with examples, as described herein, the device 605 (e.g., a processor controlling or otherwise coupled with the receiver 610, the transmitter 615, the communications manager 620, or a combination thereof) may support more flexible criteria for determining an ADU delivery status. Using the enhanced ADU criteria described herein may reduce the number of ADU retransmissions requested by the device 605, which may result in reduced power consumption at the device 605, among other benefits.

FIG. 7 shows a block diagram 700 of a device 705 that supports enhancements to ADU metadata in accordance with one or more aspects of the present disclosure. The device 705 may be an example of aspects of a device 605 or a UE 115, as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to enhancements to ADU metadata). Information may be passed on to other components of the device 705. The receiver 710 may utilize a single antenna or multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to enhancements to ADU metadata). In some examples, the transmitter 715 may be co-located with a receiver 710 in a transceiver module. The transmitter 715 may utilize a single antenna or multiple antennas.

The device 705, or various components thereof, may be an example of means for performing various aspects of enhancements to ADU metadata, as described herein. For example, the communications manager 720 may include a control information receiving component 725, a PDU receiving component 730, a delivery status determining component 735, or any combination thereof. The communications manager 720 may be an example of aspects of a communications manager 620, as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations, as described herein.

The communications manager 720 may support wireless communication at a UE (the device 605) in accordance with examples disclosed herein. The control information receiving component 725 may be configured as or otherwise support a means for receiving, from a core network entity (e.g., a UPF) via an access network entity (e.g., a base station or DU), control information that identifies criteria to use for determining a delivery status of a PDU set that includes multiple PDUs, where the PDU set is associated with an application layer of the UE. The PDU receiving component 730 may be configured as or otherwise support a means for receiving at least a portion of the PDU set with the control information. The delivery status determining component 735 may be configured as or otherwise support a means for determining the delivery status of the PDU set based on a value associated with the received portion of the PDU set and a threshold indicated by the criteria, the delivery status indicating whether the PDU set was successfully delivered to the UE.

FIG. 8 shows a block diagram 800 of a communications manager 820 that supports enhancements to ADU metadata in accordance with one or more aspects of the present disclosure. The communications manager 820 may be an example of aspects of a communications manager 620 or a communications manager 720, as described with reference to FIGS. 5 and 6. The communications manager 820, or various components thereof, may be an example of means for performing various aspects of enhancements to ADU metadata, as described herein. For example, the communications manager 820 may include a control information receiving component 825, a PDU receiving component 830, a delivery status determining component 835, a metadata determining component 840, or any combination thereof. Each of these components may communicate, directly or indirectly, with one another (e.g., via one or more buses).

The communications manager 820 may support wireless communication at a UE in accordance with examples disclosed herein. The control information receiving component 825 may be configured as or otherwise support a means for receiving, from a core network entity (e.g., a UPF) via an access network entity (e.g., a base station or DU), control information that identifies criteria to use for determining a delivery status of a PDU set that includes multiple PDUs, where the PDU set is associated with an application layer of the UE. The PDU receiving component 830 may be configured as or otherwise support a means for receiving at least a portion of the PDU set with the control information. The delivery status determining component 835 may be configured as or otherwise support a means for determining the delivery status of the PDU set based on a value associated with the received portion of the PDU set and a threshold indicated by the criteria, the delivery status indicating whether the PDU set was successfully delivered to the UE.

In some examples, to support determining the delivery status of the PDU set, the delivery status determining component 835 may be configured as or otherwise support a means for determining whether the PDU set was successfully delivered to the UE based on the value that includes a quantity of PDUs that precede a first unsuccessfully delivered PDU in the PDU set.

In some examples, to support determining the delivery status of the PDU set, the delivery status determining component 835 may be configured as or otherwise support a means for determining whether the PDU set was successfully delivered to the UE based on the value that includes a quantity of bits that precede a first unsuccessfully delivered bit in the PDU set.

In some examples, to support determining the delivery status of the PDU set, the delivery status determining component 835 may be configured as or otherwise support a means for determining whether the PDU set was successfully delivered to the UE based on the threshold that includes a threshold quantity of PDUs and the value that includes a quantity of PDUs in the received portion of the PDU set.

In some examples, to support determining the delivery status of the PDU set, the delivery status determining component 835 may be configured as or otherwise support a means for determining whether the PDU set was successfully delivered to the UE based on the value that includes a quantity of bits in the received portion of the PDU set and the threshold that includes a threshold quantity of bits.

In some examples, to support receiving the control information, the control information receiving component 825 may be configured as or otherwise support a means for receiving an indication of the threshold that includes a threshold quantity of PDUs to use for determining the delivery status of the PDU set, where the threshold quantity of PDUs is less than or equal to a total quantity of PDUs in the PDU set.

In some examples, to support receiving the control information, the control information receiving component 825 may be configured as or otherwise support a means for receiving an indication of the threshold that includes a threshold quantity of bits to use for determining the delivery status of the PDU set, where the threshold quantity of bits is less than or equal to a total quantity of bits in the PDU set.

In some examples, to support receiving the control information, the control information receiving component 825 may be configured as or otherwise support a means for receiving metadata that indicates a flow type field associated with a PDU in the PDU set, a first sequence number associated with the PDU in the PDU set, a second sequence number associated with the PDU set, a quantity of PDUs in the PDU set, a content criteria field associated with the delivery status of the PDU set, a user plane indicator field associated with the content criteria field, or a combination thereof, where the delivery status of the PDU set depends on the metadata.

In some examples, the metadata determining component 840 may be configured as or otherwise support a means for determining whether the metadata includes the first sequence number, the second sequence number, the quantity of PDUs in the PDU set, and the user plane indicator field based on a value of the flow type field.

In some examples, the metadata determining component 840 may be configured as or otherwise support a means for determining whether the metadata includes the content criteria field based on a value of the user plane indicator field and a value of the flow type field.

In some examples, the first sequence number identifies the PDU set. In some examples, the second sequence number identifies a PDU within the PDU set. In some examples, a first value of the user plane indicator field indicates that the delivery status of the PDU set depends on whether all PDUs in the PDU set were successfully delivered.

In some examples, a second value of the user plane indicator field indicates that the delivery status of the PDU set depends on the content criteria field. In some examples, the content criteria field includes an FEC information field, a delivery threshold field, or both.

In some examples, to support receiving the control information, the control information receiving component 825 may be configured as or otherwise support a means for receiving metadata that indicates an applicability field associated with the criteria, a size indicator field, a quantity of PDUs in the PDU set, a quantity of bits in a PDU of the PDU set, an FEC indicator field, an FEC information field associated with the delivery status of the PDU set, a delivery threshold field associated with the delivery status of the PDU set, or a combination thereof, where the delivery status of the PDU set depends on the metadata.

In some examples, the metadata determining component 840 may be configured as or otherwise support a means for determining whether the criteria are defined with respect to PDUs or bits based on a value of the applicability field.

In some examples, the metadata determining component 840 may be configured as or otherwise support a means for determining whether the metadata indicates the quantity of PDUs in the PDU set based on a value of the size indicator field.

In some examples, the metadata determining component 840 may be configured as or otherwise support a means for determining whether the metadata includes the FEC information field based on a value of the FEC indicator field.

In some examples, the metadata determining component 840 may be configured as or otherwise support a means for determining the criteria based on a value of the applicability field, a value of the FEC indicator field, a value of the FEC information field, a value of the delivery threshold field, or a combination thereof.

In some examples, the metadata determining component 840 may be configured as or otherwise support a means for determining whether the metadata includes the delivery threshold field based on a value of the FEC indicator field and a value of the FEC information field.

In some examples, the delivery threshold field indicates a threshold quantity of PDUs if the applicability field is set to a first value. In some examples, the delivery threshold field indicates a threshold quantity of bits if the applicability field is set to a second value.

In some examples, the metadata determining component 840 may be configured as or otherwise support a means for determining whether the metadata indicates the quantity of bits in the PDU of the PDU set based on a value of the applicability field.

In some examples, the control information receiving component 825 may be configured as or otherwise support a means for receiving control information indicating whether the criteria are associated with a dynamic FEC scheme or a static FEC scheme. In some examples, the control information is included in a PDCP header of a PDU in the PDU set.

FIG. 9 shows a diagram of a system 900 including a device 905 that supports enhancements to ADU metadata in accordance with one or more aspects of the present disclosure. The device 905 may be an example of or include the components of a device 605, a device 705, or a UE 115, as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links, as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting enhancements to ADU metadata). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples disclosed herein. For example, the communications manager 920 may be configured as or otherwise support a means for receiving, from a core network entity (e.g., a UPF) via an access network entity (e.g., a base station or DU), control information that identifies criteria to use for determining a delivery status of a PDU set that includes multiple PDUs, where the PDU set is associated with an application layer of the UE. The communications manager 920 may be configured as or otherwise support a means for receiving at least a portion of the PDU set with the control information. The communications manager 920 may be configured as or otherwise support a means for determining the delivery status of the PDU set based on a value associated with the received portion of the PDU set and a threshold indicated by the criteria, the delivery status indicating whether the PDU set was successfully delivered to the UE.

By including or configuring the communications manager 920 in accordance with examples, as described herein, the device 905 may support techniques for improving the flexibility and applicability of ADU delivery criteria (parameters used to determine whether an ADU was successfully delivered or not). For example, an ADU may be successfully delivered even if some PDUs or bits are unsuccessfully received. In such examples, the device 905 may determine the delivery status of the ADU with respect to a threshold quantity of PDUs or bits, a quantity of successfully delivered PDUs or bits, or some combination thereof.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of enhancements to ADU metadata, as described herein, or the processor 940 and the memory 930 may be otherwise configured to perform or support such operations.

FIG. 10 shows a block diagram 1000 of a device 1005 that supports enhancements to ADU metadata in accordance with one or more aspects of the present disclosure. The device 1005 may be an example of aspects of a network entity 105, as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, PDUs, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, PDUs, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of enhancements to ADU metadata, as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations, as described herein.

The communications manager 1020 may support wireless communication at an access network entity (the device 905) in accordance with examples disclosed herein. For example, the communications manager 1020 may be configured as or otherwise support a means for outputting control information that identifies criteria to use for determining a delivery status of a PDU set that includes multiple PDUs, where the PDU set is associated with an application layer of the access network entity. The communications manager 1020 may be configured as or otherwise support a means for outputting the multiple PDUs in the PDU set with the control information, where the delivery status of the PDU set is based on a threshold indicated by the criteria.

By including or configuring the communications manager 1020 in accordance with examples, as described herein, the device 1005 (e.g., a processor controlling or otherwise coupled with the receiver 1010, the transmitter 1015, the communications manager 1020, or a combination thereof) may support more flexible criteria for determining an ADU delivery status. Using the enhanced ADU criteria described herein may reduce the number of ADU retransmissions performed by the device 1005, which may result in decreased power consumption at the device 1005, among other benefits.

FIG. 11 shows a block diagram 1100 of a device 1105 that supports enhancements to ADU metadata in accordance with one or more aspects of the present disclosure. The device 1105 may be an example of aspects of a device 1005 or a network entity 105, as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, PDUs, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, PDUs, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of enhancements to ADU metadata, as described herein. For example, the communications manager 1120 may include a control information outputting component 1125 a PDU outputting component 1130, or any combination thereof. The communications manager 1120 may be an example of aspects of a communications manager 1020, as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations, as described herein.

The communications manager 1120 may support wireless communication at an access network entity (the device 1005) in accordance with examples disclosed herein. The control information outputting component 1125 may be configured as or otherwise support a means for outputting control information that identifies criteria to use for determining a delivery status of a PDU set that includes multiple PDUs, where the PDU set is associated with an application layer of the access network entity. The PDU outputting component 1130 may be configured as or otherwise support a means for outputting the multiple PDUs in the PDU set with the control information, where the delivery status of the PDU set is based on a threshold indicated by the criteria.

FIG. 12 shows a block diagram 1200 of a communications manager 1220 that supports enhancements to ADU metadata in accordance with one or more aspects of the present disclosure. The communications manager 1220 may be an example of aspects of a communications manager 1020 or a communications manager 1120, as described with reference to FIGS. 9 and 10. The communications manager 1220, or various components thereof, may be an example of means for performing various aspects of enhancements to ADU metadata, as described herein. For example, the communications manager 1220 may include a control information outputting component 1225, a PDU outputting component 1230, a PDU obtaining component 1235, a PDU delivery status component 1240, a control information obtaining component 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at an access network entity in accordance with examples disclosed herein. The control information outputting component 1225 may be configured as or otherwise support a means for outputting control information that identifies criteria to use for determining a delivery status of a PDU set that includes multiple PDUs, where the PDU set is associated with an application layer of the access network entity. The PDU outputting component 1230 may be configured as or otherwise support a means for outputting the multiple PDUs in the PDU set with the control information, where the delivery status of the PDU set is based on a threshold indicated by the criteria.

In some examples, the PDU obtaining component 1235 may be configured as or otherwise support a means for obtaining, from a core network entity, at least a portion of the PDU set. In some examples, the PDU delivery status component 1240 may be configured as or otherwise support a means for determining the delivery status of the PDU set based on the obtained portion of the PDU set and the criteria identified by the control information.

In some examples, to support determining the delivery status of the PDU set, the PDU delivery status component 1240 may be configured as or otherwise support a means for determining whether the PDU set was successfully delivered to the access network entity based on a quantity of PDUs that precede a first unsuccessfully delivered PDU in the PDU set.

In some examples, to support determining the delivery status of the PDU set, the PDU delivery status component 1240 may be configured as or otherwise support a means for determining whether the PDU set was successfully delivered to the access network entity based on a quantity of bits that precede a first unsuccessfully delivered bit in the PDU set.

In some examples, to support determining the delivery status of the PDU set, the PDU delivery status component 1240 may be configured as or otherwise support a means for determining whether the PDU set was successfully delivered to the access network entity based on the threshold that includes a threshold quantity of PDUs and a quantity of PDUs in the obtained portion of the PDU set.

In some examples, to support determining the delivery status of the PDU set, the PDU delivery status component 1240 may be configured as or otherwise support a means for determining whether the PDU set was successfully delivered to the access network entity based on the threshold that includes a threshold quantity of bits and a quantity of bits in the obtained portion of the PDU set.

In some examples, the control information obtaining component 1245 may be configured as or otherwise support a means for obtaining an indication of the threshold that includes a threshold quantity of PDUs to use for determining the delivery status of the PDU set, where the threshold quantity of PDUs is less than or equal to a total quantity of PDUs in the PDU set.

In some examples, the control information obtaining component 1245 may be configured as or otherwise support a means for obtaining an indication of the threshold that includes a threshold quantity of bits to use for determining the delivery status of the PDU set, where the threshold quantity of bits is less than or equal to a total quantity of bits in the PDU set.

In some examples, to support outputting the control information, the control information outputting component 1225 may be configured as or otherwise support a means for outputting an indication of the threshold that includes a threshold quantity of PDUs to use for determining the delivery status of the PDU set, where the threshold quantity of PDUs is less than or equal to a total quantity of PDUs in the PDU set.

In some examples, to support outputting the control information, the control information outputting component 1225 may be configured as or otherwise support a means for outputting an indication of the threshold that includes a threshold quantity of bits to use for determining the delivery status of the PDU set, where the threshold quantity of bits is less than or equal to a total quantity of bits in the PDU set.

In some examples, to support outputting the control information, the control information outputting component 1225 may be configured as or otherwise support a means for outputting metadata that indicates a flow type field associated with a PDU in the PDU set, a first sequence number associated with the PDU in the PDU set, a second sequence number associated with the PDU set, a quantity of PDUs in the PDU set, a content criteria field associated with the delivery status of the PDU set, a user plane indicator field associated with the content criteria field, or a combination thereof, where the delivery status of the PDU set is based on the metadata.

In some examples, to support outputting the control information, the control information outputting component 1225 may be configured as or otherwise support a means for outputting metadata that indicates an applicability field associated with the criteria, a size indicator field, a quantity of PDUs in the PDU set, a quantity of bits in a PDU of the PDU set, an FEC indicator field, an FEC information field associated with the delivery status of the PDU set, a delivery threshold field associated with the delivery status of the PDU set, or a combination thereof, where the delivery status of the PDU set is based on the metadata.

FIG. 13 shows a diagram of a system 1300 including a device 1305 that supports enhancements to ADU metadata in accordance with one or more aspects of the present disclosure. The device 1305 may be an example of or include the components of a device 1005, a device 1105, or a network entity 105, as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both, as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting enhancements to ADU metadata). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system.

A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both.

The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at an access network entity (the device 1305) in accordance with examples disclosed herein. For example, the communications manager 1320 may be configured as or otherwise support a means for outputting control information that identifies criteria to use for determining a delivery status of a PDU set that includes multiple PDUs, where the PDU set is associated with an application layer of the access network entity. The communications manager 1320 may be configured as or otherwise support a means for outputting the multiple PDUs in the PDU set with the control information, where the delivery status of the PDU set is based on a threshold indicated by the criteria.

By including or configuring the communications manager 1320 in accordance with examples, as described herein, the device 1305 may support techniques for improving the flexibility and applicability of ADU delivery criteria (parameters used to determine whether an ADU was successfully delivered or not). For example, an ADU may be successfully delivered even if some PDUs or bits are unsuccessfully received. In such examples, the device 1305 may determine the delivery status of the ADU with respect to a threshold quantity of PDUs or bits, a quantity of successfully delivered PDUs or bits, or some combination thereof.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of enhancements to ADU metadata, as described herein, or the processor 1335 and the memory 1325 may be otherwise configured to perform or support such operations.

FIG. 14 shows a flowchart illustrating a method 1400 that supports enhancements to ADU metadata in accordance with one or more aspects of the present disclosure. The operations of the method 1400 may be implemented by a UE or components thereof. For example, the operations of the method 1400 may be performed by a UE 115, as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the UE may receive, from a core network entity via an access network entity, control information that identifies criteria to use for determining a delivery status of a PDU set that includes multiple PDUs, where the PDU set is associated with an application layer of the UE. The operations of 1405 may be performed in accordance with examples disclosed herein. In some examples, aspects of the operations of 1405 may be performed by a control information receiving component 825, as described with reference to FIG. 8.

At 1410, the UE may receive at least a portion of the PDU set with the control information. The operations of 1410 may be performed in accordance with examples disclosed herein. In some examples, aspects of the operations of 1410 may be performed by a PDU receiving component 830, as described with reference to FIG. 8.

At 1415, the UE may determine the delivery status of the PDU set based on a value associated with the received portion of the PDU set and a threshold indicated by the criteria, the delivery status indicating whether the PDU set was successfully delivered to the UE. The operations of 1415 may be performed in accordance with examples disclosed herein. In some examples, aspects of the operations of 1415 may be performed by a delivery status determining component 835, as described with reference to FIG. 8.

FIG. 15 shows a flowchart illustrating a method 1500 that supports enhancements to ADU metadata in accordance with one or more aspects of the present disclosure. The operations of the method 1500 may be implemented by a UE or components thereof. For example, the operations of the method 1500 may be performed by a UE 115, as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the UE may receive, from a core network entity via an access network entity, control information that identifies criteria to use for determining a delivery status of a PDU set that includes multiple PDUs, where the PDU set is associated with an application layer of the UE. The operations of 1505 may be performed in accordance with examples disclosed herein. In some examples, aspects of the operations of 1505 may be performed by a control information receiving component 825, as described with reference to FIG. 8.

At 1510, the UE may receive metadata that indicates a flow type field associated with a PDU in the PDU set, a first sequence number associated with the PDU in the PDU set, a second sequence number associated with the PDU set, a quantity of PDUs in the PDU set, a content criteria field associated with the delivery status of the PDU set, a user plane indicator field associated with the content criteria field, or a combination thereof. The operations of 1510 may be performed in accordance with examples disclosed herein. In some examples, aspects of the operations of 1510 may be performed by a control information receiving component 825, as described with reference to FIG. 8.

At 1515, the UE may receive at least a portion of the PDU set with the control information. The operations of 1515 may be performed in accordance with examples disclosed herein. In some examples, aspects of the operations of 1515 may be performed by a PDU receiving component 830, as described with reference to FIG. 8.

At 1520, the UE may determine the delivery status of the PDU set based on a value associated with the received portion of the PDU set and a threshold indicated by the criteria, the delivery status indicating whether the PDU set was successfully delivered to the UE. The operations of 1520 may be performed in accordance with examples disclosed herein. In some examples, aspects of the operations of 1520 may be performed by a delivery status determining component 835, as described with reference to FIG. 8.

FIG. 16 shows a flowchart illustrating a method 1600 that supports enhancements to ADU metadata in accordance with one or more aspects of the present disclosure. The operations of the method 1600 may be implemented by an access network entity or components thereof. For example, the operations of the method 1600 may be performed by a network entity 105, as described with reference to FIGS. 1 through 5 and 10 through 13. In some examples, an access network entity may execute a set of instructions to control the functional elements of the access network entity to perform the described functions. Additionally, or alternatively, the access network entity may perform aspects of the described functions using special-purpose hardware.

At 1605, the access network entity may output control information that identifies criteria to use for determining a delivery status of a PDU set that includes multiple PDUs, where the PDU set is associated with an application layer of the access network entity. The operations of 1605 may be performed in accordance with examples disclosed herein. In some examples, aspects of the operations of 1605 may be performed by a control information outputting component 1225, as described with reference to FIG. 12.

At 1610, the access network entity may output the multiple PDUs of the PDU set with the control information, where the delivery status of the PDU set is based on a threshold indicated by the criteria. The operations of 1610 may be performed in accordance with examples disclosed herein. In some examples, aspects of the operations of 1610 may be performed by a PDU outputting component 1230, as described with reference to FIG. 12.

FIG. 17 shows a flowchart illustrating a method 1700 that supports enhancements to ADU metadata in accordance with one or more aspects of the present disclosure. The operations of the method 1700 may be implemented by an access network entity or components thereof. For example, the operations of the method 1700 may be performed by a network entity, as described with reference to FIGS. 1 through 5 and 10 through 13. In some examples, an access network entity may execute a set of instructions to control the functional elements of the access network entity to perform the described functions. Additionally, or alternatively, the access network entity may perform aspects of the described functions using special-purpose hardware.

At 1705, the access network entity may output control information that identifies criteria to use for determining a delivery status of a PDU set that includes multiple PDUs, where the PDU set is associated with an application layer of the access network entity. The operations of 1705 may be performed in accordance with examples disclosed herein. In some examples, aspects of the operations of 1705 may be performed by a control information outputting component 1225, as described with reference to FIG. 12.

At 1710, the access network entity may output metadata that indicates an applicability field associated with the criteria, a size indicator field, a quantity of PDUs in the PDU set, a quantity of bits in a PDU of the PDU set, an FEC indicator field, an FEC information field associated with the delivery status of the PDU set, a delivery threshold field associated with the delivery status of the PDU set, or a combination thereof. The operations of 1710 may be performed in accordance with examples disclosed herein. In some examples, aspects of the operations of 1710 may be performed by a control information outputting component 1225, as described with reference to FIG. 12.

At 1715, the access network entity may output the multiple PDUs in the PDU set with the control information, where the delivery status of the PDU set is based on a threshold indicated by the criteria. The operations of 1715 may be performed in accordance with examples disclosed herein. In some examples, aspects of the operations of 1715 may be performed by a PDU outputting component 1230, as described with reference to FIG. 12.

The following provides an overview of aspects of the present disclosure:

Aspect 1: A method for wireless communication at a UE, comprising: receiving, from a core network entity via an access network entity, control information that identifies criteria to use for determining a delivery status of a protocol data unit set that comprises a plurality of protocol data units, wherein the protocol data unit set is associated with an application layer of the UE; receiving at least a portion of the protocol data unit set with the control information; and determining the delivery status of the protocol data unit set based at least in part on a value associated with the received portion of the protocol data unit set and a threshold indicated by the criteria, the delivery status indicating whether the protocol data unit set was successfully delivered to the UE.

Aspect 2: The method of aspect 1, wherein determining the delivery status of the protocol data unit set comprises: determining whether the protocol data unit set was successfully delivered to the UE based at least in part on the value that comprises a quantity of protocol data units preceding a first unsuccessfully delivered protocol data unit in the protocol data unit set.

Aspect 3: The method of aspect 1, wherein determining the delivery status of the protocol data unit set comprises: determining whether the protocol data unit set was successfully delivered to the UE based at least in part on the value that comprises a quantity of bits preceding a first unsuccessfully delivered bit in the protocol data unit set.

Aspect 4: The method of aspect 1, wherein determining the delivery status of the protocol data unit set comprises: determining whether the protocol data unit set was successfully delivered to the UE based at least in part on the threshold that comprises a threshold quantity of protocol data units and the value that comprises a quantity of protocol data units in the received portion of the protocol data unit set.

Aspect 5: The method of aspect 1, wherein determining the delivery status of the protocol data unit set comprises:

determining whether the protocol data unit set was successfully delivered to the UE based at least in part on the value that comprises a quantity of bits in the received portion of the protocol data unit set and the threshold that comprises a threshold quantity of bits.

Aspect 6: The method of aspect 1, wherein receiving the control information comprises: receiving an indication of the threshold that comprises a threshold quantity of protocol data units to use for determining the delivery status of the protocol data unit set, wherein the threshold quantity of protocol data units is less than or equal to a total quantity of protocol data units in the protocol data unit set.

Aspect 7: The method of aspect 1, wherein receiving the control information comprises: receiving an indication of the threshold that comprises a threshold quantity of bits to use for determining the delivery status of the protocol data unit set, wherein the threshold quantity of bits is less than or equal to a total quantity of bits in the protocol data unit set.

Aspect 8: The method of any of aspects 1 through 7, wherein receiving the control information comprises: receiving metadata that indicates a flow type field associated with a protocol data unit in the protocol data unit set, a first sequence number associated with the protocol data unit in the protocol data unit set, a second sequence number associated with the protocol data unit set, a quantity of protocol data units in the protocol data unit set, a content criteria field associated with the delivery status of the protocol data unit set, a user plane indicator field associated with the content criteria field, or a combination thereof.

Aspect 9: The method of aspect 8, further comprising: determining whether the metadata includes the first sequence number, the second sequence number, the quantity of protocol data units in the protocol data unit set, and the user plane indicator field based at least in part on a value of the flow type field.

Aspect 10: The method of any of aspects 8 through 9, further comprising: determining whether the metadata includes the content criteria field based at least in part on a value of the user plane indicator field and a value of the flow type field.

Aspect 11: The method of any of aspects 8 through 10, wherein the first sequence number identifies the protocol data unit set; and the second sequence number identifies a protocol data unit within the protocol data unit set.

Aspect 12: The method of any of aspects 8 through 11, wherein a first value of the user plane indicator field indicates that the delivery status of the protocol data unit set depends on whether all protocol data units in the protocol data unit set were successfully delivered; and a second value of the user plane indicator field indicates that the delivery status of the protocol data unit set depends on the content criteria field.

Aspect 13: The method of any of aspects 8 through 12, wherein the content criteria field includes a forward error correction information field, a delivery threshold field, or both.

Aspect 14: The method of any of aspects 1 through 13, wherein receiving the control information comprises: receiving metadata that indicates an applicability field associated with the criteria, a size indicator field, a quantity of protocol data units in the protocol data unit set, a quantity of bits in a protocol data unit of the protocol data unit set, a forward error correction indicator field, a forward error correction information field associated with the delivery status of the protocol data unit set, a delivery threshold field associated with the delivery status of the protocol data unit set, or a combination thereof.

Aspect 15: The method of aspect 14, further comprising: determining whether the criteria are defined with respect to protocol data units or bits based at least in part on a value of the applicability field.

Aspect 16: The method of any of aspects 14 through 15, further comprising: determining whether the metadata indicates the quantity of protocol data units in the protocol data unit set based at least in part on a value of the size indicator field.

Aspect 17: The method of any of aspects 14 through 16, further comprising: determining whether the metadata includes the forward error correction information field based at least in part on a value of the forward error correction indicator field.

Aspect 18: The method of any of aspects 14 through 17, further comprising: determining the criteria based at least in part on a value of the applicability field, a value of the forward error correction indicator field, a value of the forward error correction information field, a value of the delivery threshold field, or a combination thereof.

Aspect 19: The method of any of aspects 14 through 18, further comprising: determining whether the metadata includes the delivery threshold field based at least in part on a value of the forward error correction indicator field and a value of the forward error correction information field.

Aspect 20: The method of any of aspects 14 through 19, wherein the delivery threshold field indicates a threshold quantity of protocol data units if the applicability field is set to a first value; and the delivery threshold field indicates a threshold quantity of bits if the applicability field is set to a second value.

Aspect 21: The method of any of aspects 14 through 20, further comprising: determining whether the metadata indicates the quantity of bits in the protocol data unit of the protocol data unit set based at least in part on a value of the applicability field.

Aspect 22: The method of any of aspects 1 through 21, further comprising: receiving control information indicating whether the criteria are associated with a dynamic forward error correction scheme or a static forward error correction scheme.

Aspect 23: The method of any of aspects 1 through 22, wherein the control information is included in a packet data convergence protocol header of a protocol data unit in the protocol data unit set.

Aspect 24: A method for wireless communication at an access network entity, comprising: outputting control information that identifies criteria to use for determining a delivery status of a protocol data unit set that comprises a plurality of protocol data units, wherein the protocol data unit set is associated with an application layer of the access network entity; and outputting the plurality of protocol data units in the protocol data unit set with the control information, wherein the delivery status of the protocol data unit set is based at least in part on a threshold indicated by the criteria.

Aspect 25: The method of aspect 24, further comprising: obtaining, from a core network entity, at least a portion of the protocol data unit set; and determining the delivery status of the protocol data unit set based at least in part on the obtained portion of the protocol data unit set and the criteria identified by the control information.

Aspect 26: The method of aspect 25, wherein determining the delivery status of the protocol data unit set comprises: determining whether the protocol data unit set was successfully delivered to the access network entity based at least in part on a quantity of protocol data units that precede a first unsuccessfully delivered protocol data unit in the protocol data unit set.

Aspect 27: The method of aspect 25, wherein determining the delivery status of the protocol data unit set comprises: determining whether the protocol data unit set was successfully delivered to the network entity based at least in part on a quantity of bits that precede a first unsuccessfully delivered bit in the protocol data unit set.

Aspect 28: The method of aspect 25, wherein determining the delivery status of the protocol data unit set comprises: determining whether the protocol data unit set was successfully delivered to the network entity based at least in part on a threshold quantity of protocol data units and a quantity of protocol data units in the obtained portion of the protocol data unit set.

Aspect 29: The method of aspect 25, wherein determining the delivery status of the protocol data unit set comprises: determining whether the protocol data unit set was successfully delivered to the network entity based at least in part on a threshold quantity of bits and a quantity of bits in the obtained portion of the protocol data unit set.

Aspect 30: The method of aspect 24, further comprising: obtaining an indication of a threshold quantity of protocol data units to use for determining the delivery status of the protocol data unit set, wherein the threshold quantity of protocol data units is less than or equal to a total quantity of protocol data units in the protocol data unit set.

Aspect 31: The method of aspect 24, further comprising: obtaining an indication of a threshold quantity of bits to use for determining the delivery status of the protocol data unit set, wherein the threshold quantity of bits is less than or equal to a total quantity of bits in the protocol data unit set.

Aspect 32: The method of aspect 24, wherein outputting the control information comprises: outputting an indication of a threshold quantity of protocol data units to use for determining the delivery status of the protocol data unit set, wherein the threshold quantity of protocol data units is less than or equal to a total quantity of protocol data units in the protocol data unit set.

Aspect 33: The method of aspect 24, wherein outputting the control information comprises: outputting an indication of a threshold quantity of bits to use for determining the delivery status of the protocol data unit set, wherein the threshold quantity of bits is less than or equal to a total quantity of bits in the protocol data unit set.

Aspect 34: The method of any of aspects 24 through 33, wherein outputting the control information comprises: outputting metadata that indicates a flow type field associated with a protocol data unit in the protocol data unit set, a first sequence number associated with the protocol data unit in the protocol data unit set, a second sequence number associated with the protocol data unit set, a quantity of protocol data units in the protocol data unit set, a content criteria field associated with the delivery status of the protocol data unit set, a user plane indicator field associated with the content criteria field, or a combination thereof.

Aspect 35: The method of any of aspects 24 through 34, wherein outputting the control information comprises: outputting metadata that indicates an applicability field associated with the criteria, a size indicator field, a quantity of protocol data units in the protocol data unit set, a quantity of bits in a protocol data unit of the protocol data unit set, a forward error correction indicator field, a forward error correction information field associated with the delivery status of the protocol data unit set, a delivery threshold field associated with the delivery status of the protocol data unit set, or a combination thereof.

Aspect 36: An apparatus for wireless communication at a UE, comprising a processor, memory coupled with the processor, and instructions stored in the memory, wherein the instructions are executable by the processor to cause the apparatus to perform a method of any of aspects 1 through 23.

Aspect 37: An apparatus for wireless communication at a UE, comprising at least one means for performing a method of any of aspects 1 through 23.

Aspect 38: A non-transitory computer-readable medium storing code for wireless communication at a UE, the code comprising instructions that are executable by a processor to perform a method of any of aspects 1 through 23.

Aspect 39: An apparatus for wireless communication at an access network entity, comprising a processor, memory coupled with the processor, and instructions stored in the memory, wherein the instructions are executable by the processor to cause the apparatus to perform a method of any of aspects 24 through 35.

Aspect 40: An apparatus for wireless communication at an access network entity, comprising at least one means for performing a method of any of aspects 24 through 35.

Aspect 41: A non-transitory computer-readable medium storing code for wireless communication at an access network entity, the code comprising instructions that are executable by a processor to perform a method of any of aspects 24 through 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory)

and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more memories storing processor-executable code; and
   one or more processors coupled with the one or more memories and individually or collectively operable to execute the code to cause the apparatus to:
     receive, from a core network entity via an access network entity, control information that identifies criteria to use for determining a delivery status of a protocol data unit set that comprises a plurality of protocol data units, wherein the protocol data unit set is associated with an application layer of the UE, and wherein the control information comprises a flow type field that indicates that a protocol data unit of the plurality of protocol data units belongs to a service flow;
     receive at least a portion of the protocol data unit set with the control information; and
     determine the delivery status of the protocol data unit set based at least in part on a value associated with the received portion of the protocol data unit set and a threshold indicated by the criteria, the delivery status indicating whether the protocol data unit set was successfully delivered to the UE.

2. The apparatus of claim 1, wherein, to determine the delivery status of the protocol data unit set, the one or more processors are individually or collectively operable to execute the code to cause the apparatus to:
   determine whether the protocol data unit set was successfully delivered to the UE based at least in part on the value that comprises a quantity of protocol data units preceding a first unsuccessfully delivered protocol data unit in the protocol data unit set.

3. The apparatus of claim 1, wherein, to determine the delivery status of the protocol data unit set, the one or more processors are individually or collectively operable to execute the code to cause the apparatus to:

determine whether the protocol data unit set was successfully delivered to the UE based at least in part on the value that comprises a quantity of bits preceding a first unsuccessfully delivered bit in the protocol data unit set.

4. The apparatus of claim 1, wherein, to determine the delivery status of the protocol data unit set, the one or more processors are individually or collectively operable to execute the code to cause the apparatus to:

determine whether the protocol data unit set was successfully delivered to the UE based at least in part on the threshold that comprises a threshold quantity of protocol data units and the value that comprises a quantity of protocol data units in the received portion of the protocol data unit set.

5. The apparatus of claim 1, wherein, to determine the delivery status of the protocol data unit set, the one or more processors are individually or collectively operable to execute the code to cause the apparatus to:

determine whether the protocol data unit set was successfully delivered to the UE based at least in part on the value that comprises a quantity of bits in the received portion of the protocol data unit set and the threshold that comprises a threshold quantity of bits.

6. The apparatus of claim 1, wherein, to receive the control information, the one or more processors are individually or collectively operable to execute the code to cause the apparatus to:

receive an indication of the threshold that comprises a threshold quantity of protocol data units to use for determining the delivery status of the protocol data unit set, wherein the threshold quantity of protocol data units is less than or equal to a total quantity of protocol data units in the protocol data unit set.

7. The apparatus of claim 1, wherein, to receive the control information, the one or more processors are individually or collectively operable to execute the code to cause the apparatus to:

receive an indication of the threshold that comprises a threshold quantity of bits to use for determining the delivery status of the protocol data unit set, wherein the threshold quantity of bits is less than or equal to a total quantity of bits in the protocol data unit set.

8. The apparatus of claim 1, wherein, to receive the control information, the one or more processors are individually or collectively operable to execute the code to cause the apparatus to:

receive metadata that indicates a first sequence number associated with the protocol data unit in the protocol data unit set, a second sequence number associated with the protocol data unit set, a quantity of protocol data units in the protocol data unit set, a content criteria field associated with the delivery status of the protocol data unit set, a user plane indicator field associated with the content criteria field, or a combination thereof.

9. The apparatus of claim 8, wherein a value of the flow type field indicates whether the metadata includes the first sequence number, the second sequence number, the quantity of protocol data units in the protocol data unit set, and the user plane indicator field.

10. The apparatus of claim 8, wherein the metadata includes the user plane indicator field, and wherein a value of the user plane indicator field indicates whether the metadata includes the content criteria field.

11. The apparatus of claim 8, wherein the metadata includes the first sequence number and the second sequence number, wherein the first sequence number identifies the protocol data unit set, and wherein the second sequence number identifies the protocol data unit.

12. The apparatus of claim 8, wherein the metadata includes the user plane indicator field, wherein a first value of the user plane indicator field indicates that the delivery status of the protocol data unit set depends on whether all protocol data units in the protocol data unit set were successfully delivered, and wherein a second value of the user plane indicator field indicates that the delivery status of the protocol data unit set depends on the content criteria field.

13. The apparatus of claim 8, wherein the metadata includes the content criteria field, and wherein the content criteria field includes a forward error correction information field, a delivery threshold field, or both.

14. The apparatus of claim 1, wherein, to receive the control information, the one or more processors are individually or collectively operable to execute the code to cause the apparatus to:

receive metadata that indicates an applicability field associated with the criteria, a size indicator field, a quantity of protocol data units in the protocol data unit set, a quantity of bits in the protocol data unit, a forward error correction indicator field, a forward error correction information field associated with the delivery status of the protocol data unit set, a delivery threshold field associated with the delivery status of the protocol data unit set, or a combination thereof.

15. The apparatus of claim 14, wherein the metadata includes the applicability field, and wherein a value of the applicability field indicates whether the criteria are defined with respect to protocol data units or bits.

16. The apparatus of claim 14, wherein the metadata includes the size indicator field, and wherein a value of the size indicator field indicates whether the metadata indicates the quantity of protocol data units in the protocol data unit set.

17. The apparatus of claim 14, wherein the metadata includes the forward error correction indicator field, and wherein a value of the forward error correction indicator field indicates whether the metadata includes the forward error correction information field.

18. The apparatus of claim 14, wherein the metadata includes the applicability field, a value of the forward error correction indicator field, a value of the forward error correction information field, a value of the delivery threshold field, or a combination thereof, and wherein the criteria is based at least in part on a value of the applicability field, a value of the forward error correction indicator field, a value of the forward error correction information field, a value of the delivery threshold field, or a combination thereof.

19. The apparatus of claim 14, wherein the metadata includes the forward error correction indicator field and the forward error correction information field, and wherein whether the metadata includes the delivery threshold field is based at least in part on a value of the forward error correction indicator field and a value of the forward error correction information field.

20. The apparatus of claim 14, wherein the metadata includes the delivery threshold field, wherein the delivery threshold field indicates a threshold quantity of protocol data units if the applicability field is set to a first value, and wherein the delivery threshold field indicates a threshold quantity of bits if the applicability field is set to a second value.

21. The apparatus of claim 14, wherein the metadata includes the applicability field, and wherein a value of the applicability field indicates whether the metadata indicates the quantity of bits in the protocol data unit of the protocol data unit set.

22. The apparatus of claim 1, wherein the one or more processors are individually or collectively further operable to execute the code to cause the apparatus to:

receive control information indicating whether the criteria are associated with a dynamic forward error correction scheme or a static forward error correction scheme.

23. The apparatus of claim 1, wherein the control information is included in a packet data convergence protocol header of the protocol data unit.

24. An apparatus for wireless communication at an access network entity, comprising:

one or more memories storing processor-executable code; and one or more processors coupled with the one or more memories and individually or collectively operable to execute the code to cause the apparatus to:

output control information that identifies criteria to use for determining a delivery status of a protocol data unit set that comprises a plurality of protocol data units, wherein the protocol data unit set is associated with an application layer of the access network entity, and wherein the control information comprises a flow type field that indicates that a protocol data unit of the plurality of protocol data units belongs to a service flow; and output the plurality of protocol data units in the protocol data unit set with the control information, wherein the delivery status of the protocol data unit set is based at least in part on a threshold indicated by the criteria.

25. The apparatus of claim 24, wherein the one or more processors are individually or collectively further operable to execute the code to cause the apparatus to:

obtain, from a core network entity, at least a portion of the protocol data unit set; and determine the delivery status of the protocol data unit set based at least in part on the obtained portion of the protocol data unit set and the criteria identified by the control information.

26. The apparatus of claim 25, wherein, to determine the delivery status of the protocol data unit set, the one or more processors are individually or collectively operable to execute the code to cause the apparatus to:

determine whether the protocol data unit set was successfully delivered to the access network entity based at least in part on a quantity of protocol data units that precede a first unsuccessfully delivered protocol data unit in the protocol data unit set.

27. The apparatus of claim 24, wherein, to output the control information, the one or more processors are individually or collectively operable to execute the code to cause the apparatus to:

output metadata that indicates a first sequence number associated with the protocol data unit in the protocol data unit set, a second sequence number associated with the protocol data unit set, a quantity of protocol data units in the protocol data unit set, a content criteria field associated with the delivery status of the protocol data unit set, a user plane indicator field associated with the content criteria field, or a combination thereof.

28. The apparatus of claim 24, wherein, to output the control information, the one or more processors are individually or collectively operable to execute the code to cause the apparatus to:

output metadata that indicates an applicability field associated with the criteria, a size indicator field, a quantity of protocol data units in the protocol data unit set, a quantity of bits in the protocol data unit, a forward error correction indicator field, a forward error correction information field associated with the delivery status of the protocol data unit set, a delivery threshold field associated with the delivery status of the protocol data unit set, or a combination thereof.

29. A method for wireless communication at a user equipment (UE), comprising:

receiving, from a core network entity via an access network entity, control information that identifies criteria to use for determining a delivery status of a protocol data unit set that comprises a plurality of protocol data units, wherein the protocol data unit set is associated with an application layer of the UE, and wherein the control information comprises a flow type field that indicates that a protocol data unit of the plurality of protocol data units belongs to a service flow;

receiving at least a portion of the protocol data unit set with the control information; and determining the delivery status of the protocol data unit set based at least in part on a value associated with the received portion of the protocol data unit set and a threshold indicated by the criteria, the delivery status indicating whether the protocol data unit set was successfully delivered to the UE.

30. A method for wireless communication at an access network entity, comprising:

outputting control information that identifies criteria to use for determining a delivery status of a protocol data unit set that comprises a plurality of protocol data units, wherein the protocol data unit set is associated with an application layer of the access network entity, and wherein the control information comprises a flow type field that indicates that a protocol data unit of the plurality of protocol data units belongs to a service flow; and outputting the plurality of protocol data units in the protocol data unit set with the control information, wherein the delivery status of the protocol data unit set is based at least in part on a threshold indicated by the criteria.

* * * * *